United States Patent
Kaneko

(10) Patent No.: US 11,306,373 B2
(45) Date of Patent: Apr. 19, 2022

(54) ALUMINUM ALLOY MATERIAL, AND CONDUCTIVE MEMBER, BATTERY MEMBER, FASTENING PART, SPRING PART, AND STRUCTURAL PART USING ALUMINUM ALLOY MATERIAL

(71) Applicant: FURUKAWA ELECTRIC CO., LTD., Tokyo (JP)

(72) Inventor: Hiroshi Kaneko, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/979,712

(22) PCT Filed: Mar. 15, 2019

(86) PCT No.: PCT/JP2019/010972
§ 371 (c)(1),
(2) Date: Sep. 10, 2020

(87) PCT Pub. No.: WO2019/188452
PCT Pub. Date: Oct. 3, 2019

(65) Prior Publication Data
US 2021/0010110 A1    Jan. 14, 2021

(30) Foreign Application Priority Data
Mar. 27, 2018  (JP) .............................. JP2018-059188

(51) Int. Cl.
*C22C 21/08* (2006.01)
*C22C 21/02* (2006.01)
*C22F 1/05* (2006.01)

(52) U.S. Cl.
CPC .............. *C22C 21/08* (2013.01); *C22C 21/02* (2013.01); *C22F 1/05* (2013.01)

(58) Field of Classification Search
None
See application file for complete search history.

(56) References Cited

U.S. PATENT DOCUMENTS

| 5,223,349 A | 6/1993 | Kudo et al. |
| 2009/0020276 A1 | 1/2009 | Ueda et al. |

(Continued)

FOREIGN PATENT DOCUMENTS

| CN | 101155937 A | 4/2008 |
| CN | 101233251 A | 7/2008 |

(Continued)

OTHER PUBLICATIONS

International Search Report dated Jun. 11, 2019 in PCT/JP2019/010972 filed Mar. 15, 2019, 1 page.

(Continued)

*Primary Examiner* — Daniel J. Schleis
(74) *Attorney, Agent, or Firm* — Oblon, McClelland, Maier & Neustadt, L.L.P.

(57) ABSTRACT

An aluminum alloy material has an alloy composition which includes at least one among 0.2-1.8 mass % of Mg, 0.2-2.0 mass % of Si, and 0.01-1.50 mass % of Fe, with the balance being Al and inevitable impurities, and has a fibrous metal structure in which crystal grains extend in one direction. In a cross section parallel to the one direction, the average value of the dimensions of the crystal grains in a direction perpendicular to the longitudinal direction thereof is 400 nm or less, and the primary surface of the aluminum alloy material has a crystal orientation distribution in which the ratio H (K100/K111) of K100 to K111 is at least 0.17 as determined by the X-ray pole figure method, where K100 is the sum of the diffraction intensities resulting from crystals in which <100> is oriented in the longitudinal direction, and K111 is the sum of the diffraction intensities resulting from crystals in which <111> is oriented in the longitudinal direction.

20 Claims, 10 Drawing Sheets

(56) References Cited

U.S. PATENT DOCUMENTS

| | | |
|---|---|---|
| 2010/0139899 A1 | 6/2010 | Suzuki et al. |
| 2014/0124103 A1 | 5/2014 | Hatta |
| 2019/0127826 A1* | 5/2019 | Kaneko ................. C22C 21/02 |
| 2019/0136351 A1* | 5/2019 | Kaneko ................. C22C 21/14 |
| 2020/0040432 A1 | 2/2020 | Kaneko |

FOREIGN PATENT DOCUMENTS

| | | |
|---|---|---|
| CN | 103732773 A | 4/2014 |
| EP | 2 896 708 A1 | 7/2015 |
| EP | 2 902 517 A1 | 8/2015 |
| JP | 5-331585 A | 12/1993 |
| JP | 9-137244 A | 5/1997 |
| JP | 2001-131721 A | 5/2001 |
| JP | 2003-27172 A | 1/2003 |
| JP | 2010-159445 A | 7/2010 |
| JP | 2013-44039 A | 3/2013 |
| WO | WO 2018/012481 A1 | 1/2018 |
| WO | WO 2018/012482 A1 | 1/2018 |
| WO | WO 2018/181505 A1 | 10/2018 |

OTHER PUBLICATIONS

Extended European Search Report, dated Feb. 8, 2022 in European Application No. 19778286.5, 7 pages.

* cited by examiner

FIG. 2. Wire textures of various f.c.c. metals and alloys as a function of the parameter $\gamma/Gb$. Stacking-fault energy increases towards the right side of the figure. Both high and low SFE lead to sharp ⟨111⟩ textures.

(200)X-RAY POLE FIGURE OF EXAMPLE 2 OF PRESENT INVENTION (200)X-RAY POLE FIGURE OF COMPARATIVE EXAMPLE 2

ALUMINUM ALLOY MATERIAL, AND CONDUCTIVE MEMBER, BATTERY MEMBER, FASTENING PART, SPRING PART, AND STRUCTURAL PART USING ALUMINUM ALLOY MATERIAL

TECHNICAL FIELD

The present invention relates to an aluminum alloy material, in particular, relates to an aluminum alloy material having a high strength and excellent workability. Such an aluminum alloy material is used in a wide range of application (for example, a conductive member, a battery member, a fastening part, a spring part, a structural part, and a cabtire cable).

BACKGROUND ART

Recently, a technology of forming a three-dimensional structure body into a desired shape by sintering a metal powder with an electron beam, laser, or the like, has been widely considered, in accordance with the diversification of the shape of a metal member. However, in such a technology, the metal powder is used, but in a case where the metal powder is excessively fined, there is a problem that explosion easily occurs.

For this reason, recently, for example, a technology of forming a three-dimensional structure by a method such as twisting, knitting, weaving, binding, joining, and connecting metal fine wires has been developed. Such a method, for example, has been considered as Wire-Woven Cellular Materials, and has been expected to be applied to a battery part, a heat sink, an impact absorption member, and the like.

In addition, an iron-based wire rod or a copper-based wire rod has been widely used as the metal fine wire as described above, but recently, an aluminum-based material in which specific weight is small, a thermal expansion coefficient is large, electric or thermal conductive properties are comparatively excellent, corrosion resistance is excellent, an elastic coefficient is particularly small, and elastic deformation is flexibly performed, compared to an iron-based metal material or a copper-based metal material, has been considered as the replacement for the iron-based wire rod or the copper-based wire rod.

However, there is a problem that a pure aluminum material has a low strength, compared to an iron-based metal material or a copper-based metal material. In addition, a 2000-based (Al—Cu-based) aluminum alloy material or a 7000-based (Al—Zn—Mg-based) aluminum alloy material that is an aluminum alloy material having a comparatively high strength has a problem such as poor corrosion resistance, poor stress corrosion cracking resistance, poor workability, and the like.

For this reason, recently, a 6000-based (Al—Mg—Si-based) aluminum alloy material that contains Mg and Si and has excellent electric or thermal conductive properties and excellent corrosion resistance has been widely used. However, such a 6000-based aluminum alloy material has a higher strength among aluminum alloy materials, but the strength is not sufficient, and a higher strength is desired.

On the other hand, a method of crystallizing an aluminum alloy material having an amorphous phase (Patent Document 1), a fine crystal grain forming method according to an ECAP method (Patent Document 2), a fine crystal grain forming method according to cold working at a temperature of a room temperature or less (Patent Document 3), a method of dispersing carbon nanofibers (Patent Document 4), or the like is known as a method of increasing the strength of the aluminum alloy material. However, in any of these methods, the aluminum alloy material to be manufactured has a small size and is difficult to be industrially commercialized.

In addition, in Patent Document 5, a method of obtaining an Al—Mg-based alloy having a fine structure by controlling a rolling temperature is disclosed. Such a method is excellent in industrial mass-producibility, but has a problem in further increasing the strength.

On the other hand, in general, in the case of increasing the strength of the aluminum alloy material, there is also a problem that bending workability that is properties opposite to the strength decreases. For this reason, for example, in a case where the aluminum alloy material is used as the fine wire for forming the three-dimensional structure body as described above, it is also required to improve the bending workability along with an increase in the strength.

Patent Document 1: Japanese Unexamined Patent Application, Publication No. H05-331585
Patent Document 2: Japanese Unexamined Patent Application, Publication No. H09-137244
Patent Document 3: Japanese Unexamined Patent Application, Publication No. 2001-131721
Patent Document 4: Japanese Unexamined Patent Application, Publication No. 2010-159445
Patent Document 5: Japanese Unexamined Patent Application, Publication No. 2003-027172

DISCLOSURE OF THE INVENTION

Problems to be Solved by the Invention

An object of the present invention is to provide an aluminum alloy material having a high strength and excellent workability, which can be the replacement of an iron-based metal material or a copper-based metal material, and a conductive member, a battery member, a fastening part, a spring part, a structural part, and a cabtire cable using the aluminum alloy material.

Means for Solving the Problems

As a result of intensive studies of the present inventors, it has been found that an aluminum alloy material has a predetermined alloy composition and a fibrous metal structure in which crystal grains extend in one direction, in a cross section parallel to the one direction, an average value of dimensions of the crystal grains in a direction perpendicular to a longitudinal direction of the crystal grains is 400 nm or less, and a primary surface of the aluminum alloy material has a crystal orientation distribution in which when K100 is a sum of diffraction intensities resulting from crystals in which <100> is oriented in the longitudinal direction, K111 is a sum of diffraction intensities resulting from the crystals in which <111> is oriented in the longitudinal direction, and H is a ratio (K100/K111) of K100 to K111, the ratio (H) is 0.17 or more as determined by an X-ray pole figure method, and thus, an aluminum alloy material having both a high strength comparable to an iron-based metal material or a copper-based metal material and excellent workability can be obtained, and the present invention has been completed on the basis of such a finding.

That is, an overview configuration of the present invention is as follows.
(1) An aluminum alloy material having an alloy composition comprising 0.2 mass % to 1.8 mass % of Mg, 0.2 mass % to 2.0 mass % of Si, and 0.01 mass % to 1.50 mass % of Fe, with the balance being Al and inevitable impurities, in which the aluminum alloy material has a fibrous metal structure in which crystal grains extend in one direction, in a cross section parallel to the one direction, an average value of dimensions of the crystal grains in a direction perpendicular to a longitudinal direction of the crystal grains is 400 nm or less, and a primary surface of the aluminum alloy material has a crystal orientation distribution in which when K100 is a sum of diffraction intensities resulting from crystals in which <100> is oriented in the longitudinal direction, K111 is a sum of diffraction intensities resulting from crystals in which <111> is oriented in the longitudinal direction, and H is a ratio (K100/K111) of K100 to K111, the ratio (H) is 0.17 or more as determined by an X-ray pole figure method.

(2) An aluminum alloy material having an alloy composition comprising 0.2 mass % to 1.8 mass % of Mg, 0.2 mass % to 2.0 mass % of Si, and 0.01 mass % to 1.50 mass % of Fe, and a total of 2.00 mass % or less of one or more selected from the group consisting of Cu, Ag, Zn, Ni, Co, Au, Mn, Cr, V, Zr, Sn, Ti, and B, with the balance being Al and inevitable impurities, in which the aluminum alloy material has a fibrous metal structure in which crystal grains extend in one direction, in a cross section parallel to the one direction, an average value of dimensions of the crystal grains in a direction perpendicular to a longitudinal direction of the crystal grains is 400 nm or less, and a primary surface of the aluminum alloy material has a crystal orientation distribution in which when K100 is a sum of diffraction intensities resulting from crystals in which <100> is oriented in the longitudinal direction, K111 is a sum of diffraction intensities resulting from crystals in which <111> is oriented in the longitudinal direction, and H is a ratio (K100/K111) of K100 to K111, the ratio (H) is 0.17 or more as determined by an X-ray pole figure method.

(3) The aluminum alloy material according to (1) or (2) described above, in which a Vickers hardness (HV) is 100 to 250.

(4) The aluminum alloy material according to (1), (2), or (3) described above, in which the surface is covered with one or more of metals or alloys selected from the group consisting of Cu, Ni, Ag, Au, Pd, and Sn.

(5) A conductive member using the aluminum alloy material according to any one of (1) to (4) described above.

(6) A battery member using the aluminum alloy material according to any one of (1) to (4) described above.

(7) A fastening part using the aluminum alloy material according to any one of (1) to (4) described above.

(8) A spring part using the aluminum alloy material according to any one of (1) to (4) described above.

(9) A structural part using the aluminum alloy material according to any one of (1) to (4) described above.

(10) A cabtire cable using the aluminum alloy material according to any one of (1) to (4) described above.

Effects of the Invention

According to the present invention, the aluminum alloy material has a predetermined alloy composition and a fibrous metal structure in which crystal grains extend in one direction, in a cross section parallel to the one direction, an average value of dimensions of the crystal grains in a direction perpendicular to a longitudinal direction of the crystal grains is 400 nm or less, and a primary surface of the aluminum alloy material has a crystal orientation distribution in which when K100 is a sum of diffraction intensities resulting from crystals in which <100> is oriented in the longitudinal direction, K111 is a sum of diffraction intensities resulting from crystals in which <111> is oriented in the longitudinal direction, and H is a ratio (K100/K111) of K100 to K111, the ratio (H) is 0.17 or more as determined by an X-ray pole figure method, and thus, an aluminum alloy material having both a high strength comparable to an iron-based metal material or a copper-based metal material and excellent bending workability, and a conductive member, a battery member, a fastening part, a spring part, and a structural part using the aluminum alloy material can be obtained.

PREFERRED MODE FOR CARRYING OUT THE INVENTION

Figure 1:
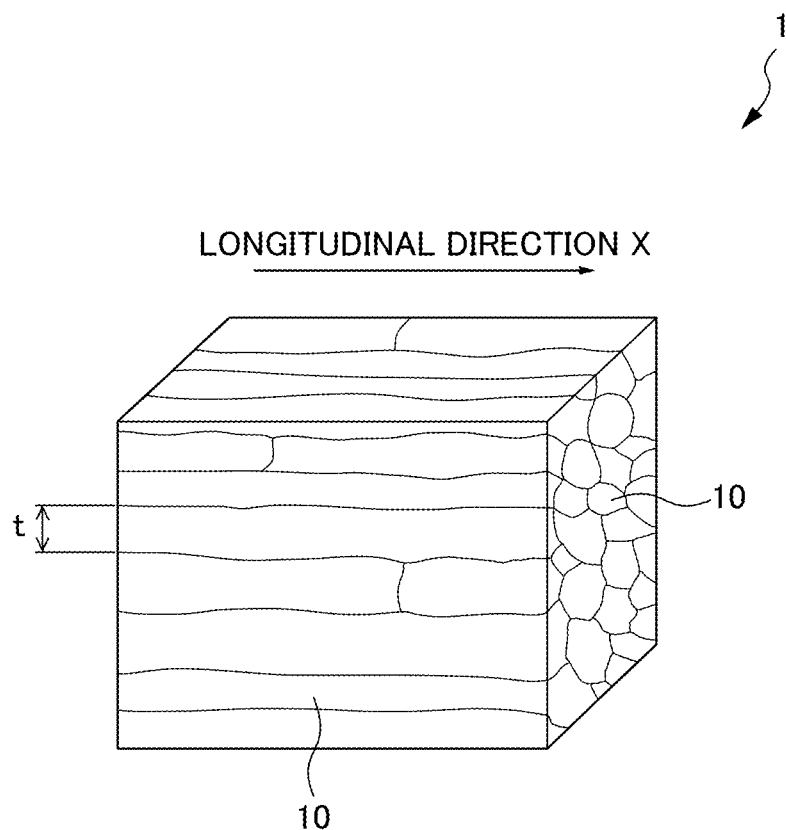
FIG. 1 is a perspective view schematically illustrating a state of a metal structure of an aluminum alloy material according to the present invention.

Hereinafter, a preferred embodiment of an aluminum alloy material of the present invention will be described in detail. An aluminum alloy material according to the present invention, is an aluminum alloy material having an alloy composition comprising 0.2 mass % to 1.8 mass % of Mg, 0.2 mass % to 2.0 mass % of Si, and 0.01 mass % to 1.50 mass % of Fe, and as necessary, a total of 2.00 mass % or less of one or more selected from the group consisting of Cu, Ag, Zn, Ni, Co, Au, Mn, Cr, V, Zr, Sn, Ti, and B, with the balance being Al and inevitable impurities, in which the aluminum alloy material has a fibrous metal structure in which crystal grains extend in one direction, in a cross section parallel to the one direction, an average value of dimensions of the crystal grains in a direction perpendicular to a longitudinal direction of the crystal grains is 400 nm or less, and a primary surface of the aluminum alloy material has a crystal orientation distribution in which when K100 is a sum of diffraction intensities resulting from crystals in which <100> is oriented in the longitudinal direction, K111 is a sum of diffraction intensities resulting from crystals in which <111> is oriented in the longitudinal direction, and H is a ratio (K100/K111) of K100 to K111, the ratio (H) is 0.17 or more as determined by an X-ray pole figure method.

Herein, the "crystal grains" indicate a portion surrounded by a misorientation boundary, and here, the "misorientation boundary" indicates a boundary in which a contrast (a channeling contrast) is discontinuously changed in a case where a metal structure is observed by using a transmission electron microscope (TEM), a scanning transmission electron microscope (STEM), a scanning ion microscope (SIM), or the like. In addition, the dimensions of the crystal grains in the direction perpendicular to the longitudinal direction correspond to the intervals of the misorientation boundaries.

In addition, the "primary surface" is a surface of the aluminum alloy material that is parallel to a working direction (a drawing direction), and indicates a surface that is directly in contact with a tool (a rolling roll or a drawing die) and is subjected to swaging (thickness-reduction working) (hereinafter, a worked surface). For example, the primary surface (the worked surface) in a case where the aluminum alloy material is a wire and rod material is the surface of the wire and rod material that is parallel to a wire drawing direction (a longitudinal direction) (an outer circumferential surface), and the primary surface (the worked surface) in a case where the aluminum alloy material is a board is the surface of the board that is in contact with a pair of upper and lower rolling rollers or the like (two surfaces on the front and back), in surfaces parallel to a rolling direction.

Here, the working direction indicates a travelling direction of the swaging. For example, in a case where the aluminum alloy material is the wire and rod material, a longitudinal direction of the wire and rod material (a direction perpendicular to a wire diameter) corresponds to the wire drawing direction. In addition, in a case where the aluminum alloy material is the board, a longitudinal direction in a state where the rolling working is performed corresponds to the rolling direction. Note that, in the case of the board, the board may be cut into a predetermined size after the rolling working, and may be fragmented, and in this case, the longitudinal direction after cutting is not necessarily coincident with the working direction, but even in such a case, the rolling direction can be checked from the worked surface of the board surface.

The aluminum alloy material according to the present invention has the fibrous metal structure in which the crystal grains extend in one direction. Here, a perspective view schematically illustrating the state of the metal structure of the aluminum alloy material according to the present invention is illustrated in FIG. 1. As illustrated in FIG. 1, the aluminum alloy material of the present invention has a fibrous structure in which crystal grains 10 having an elongated shape extend in one direction, and in FIG. 1, the crystal grains 10 extend in a longitudinal direction X. Such crystal grains having an elongated shape are considerably different from fine crystal grains of the related art, or flat crystal grains simply having a large aspect ratio. That is, the crystal grains of the present invention have an elongated shape like a fiber, and an average value of dimensions t of the crystal grains in a direction perpendicular to the longitudinal direction X is 400 nm or less. The fibrous metal structure in which such fine crystal grains extend in one direction can be referred to as a novel metal structure not existing in the aluminum alloy material of the related art.

Further, the primary surface of the aluminum alloy material of the present invention has the crystal orientation distribution in which when K100 is the sum of the diffraction intensities resulting from the crystals in which <100> is oriented in the longitudinal direction, K111 is the sum of the diffraction intensities resulting from the crystals in which <111> is oriented in the longitudinal direction, and H is the ratio (K100/K111) of K100 to K111, the ratio (H) is 0.17 or more as determined by an X-ray pole figure method. Such a texture controlled into a predetermined crystal orientation distribution can be referred to as a novel texture not existing in the primary surface of the aluminum alloy material of the related art.

In the aluminum alloy material of the present invention having the metal structure described above, in which the primary surface has the texture described above, it is possible to make a high strength comparable to an iron-based metal material or a copper-based metal material (for example, a tensile strength of 370 MPa or more and a Vickers hardness (HV) of 100 or more) and excellent bending workability (for example, properties in which in a case where the aluminum alloy material is a wire rod, a crack does not occur in the wire rod even when a winding method test based on JIS Z 2248(2014) is performed by using a bending axis having a bending axis diameter $D_B$ four times a wire diameter of the wire rod) compatible.

In addition, fining a crystal grain size is effect in not only increasing a strength but also in generally increasing the function of the material that is directly linked to a function of improving grain-boundary corrosion, a function of improving fatigue properties with respect to repetitive deformation, a function of reducing surface roughness after plastic working, a function of reducing sag and burr in shearing working, and the like.

(1) Alloy Composition

An alloy composition of the aluminum alloy material of the present invention and the function thereof will be described. The aluminum alloy material of the present invention contains 0.2 mass % to 1.8 mass % of Mg, 0.2 mass % to 2.0 mass % of Si, and 0.01 mass % to 1.50 mass % of Fe, as a basic composition, and suitably contains a total of 2.00 mass % or less of one or more selected from the group consisting of Cu, Ag, Zn, Ni, Co, Au, Mn, Cr, V, Zr, Sn, Ti, and B, as an arbitrarily added component.

<0.2 Mass % to 1.8 Mass % of Mg>

Magnesium (Mg) has a function of being reinforced by forming a solid solution in the aluminum base material and has a function of improving a tensile strength by a synergetic effect with Si. However, in a case where the content of Mg is less than 0.2 mass %, the function effect described above is insufficient, and in a case where the content of Mg is greater than 1.8 mass %, a crystallized product is formed, and thus, the workability (wire drawing workability, bending workability, or the like) decreases. Therefore, the content of Mg is 0.2 mass % to 1.8 mass %, and is preferably 0.4 mass % to 1.4 mass %.

<0.2 Mass % to 2.0 Mass % of Si>

Silicon (Si) has a function of being reinforced by forming a solid solution in the aluminum base material and a function of improving the tensile strength or resistance to flex fatigue properties by a synergetic effect with Mg. However, in a case where the content of Si is less than 0.2 mass %, the function effect described above is insufficient, and in a case where the content of Si is greater than 2.0 mass %, the crystallized product is formed, and thus, the workability decreases. Therefore, the content of Si is 0.2 mass % to 2.0 mass %, and is preferably 0.4 mass % to 1.4 mass %.

<0.01 Mass % to 1.50 Mass % of Fe>

Iron (Fe) is an element that contributes to the fining of the crystal grains and improves the tensile strength by mainly forming an Al—Fe-based intermetallic compound. Here, the intermetallic compound indicates a compound containing two or more types of metals. Only 0.05 mass % of Fe can be a solid solution in Al at 655° C., and lesser Fe can be a solid solution at a room temperature, and thus, the remaining Fe that is not capable of being a solid solution in Al is crystallized or precipitated as an Al—Fe-based intermetallic compound, an Al—Fe—Si-based intermetallic compound, and an Al—Fe—Si—Mg-based intermetallic compound. As described above, the intermetallic compound mainly containing Fe and Al is referred to as a Fe-based compound, herein. The intermetallic compound contributes to the fining of the crystal grains and improves the tensile strength. In a case where the content of Fe is less than 0.01 mass %, such a function effect is insufficient, and in a case where the content of Fe is greater than 1.50 mass %, a crystallized product increases, and thus, the workability decreases. Here, the crystallized product indicates an intermetallic compound that is generated in casting solidification of an alloy. Therefore, the content of Fe is 0.01 mass % to 1.50 mass %, is preferably 0.05 mass % to 0.28 mass %, and is more preferably 0.05 mass % to 0.23 mass %.

<Total of 2.00 Mass % or Less of One or More Selected from Group Consisting of Cu, Ag, Zn, Ni, Co, Au, Mn, Cr, V, Zr, Sn, Ti, and B>

All of copper (Cu), silver (Ag), zinc (Zn), nickel (Ni), cobalt (Co), gold (Au), manganese (Mn), chromium (Cr), vanadium (V), zirconium (Zr), tin (Sn), titanium (Ti), and boron (B) are an element that improves a strength or heat resistance, and can be suitably added as an arbitrarily added component, as necessary. Examples of a mechanism that such components improve the heat resistance include a mechanism in which a difference between an atom radius of the component described above and an atom radius of aluminum is large, and thus, the energy of a crystal grain boundary is decreased, a mechanism in which a diffusion coefficient of the component described above is large, and thus, in a case where the component enters the grain boundary, the mobility of the grain boundary is decreased, a mechanism in which a diffusion phenomenon that has a large mutual interaction with a hole and traps the hole, and thus, the diffusion phenomenon is delayed, and the like, and it is considered that such mechanisms synergistically function.

A total content of such components is 0.0001 mass % or more, and is preferably 0.06 mass % or more, from the viewpoint of obtaining the function effect described above. On the other hand, in a case where the total content of the components is greater than 2.0 mass %, there is a concern that the workability decreases. Therefore, in the case of containing one or more selected from Cu, Ag, Zn, Ni, Co, Au, Mn, Cr, V, Zr, Sn, Ti, and B, the total content thereof is 0.0001 mass % to 2.0 mass %, is preferably 0.06 mass % to 2.0 mass %, and is more preferably 0.3 mass % to 1.2 mass %. Only one type of the components may be independently contained, or two or more types thereof may be contained in combination. In particular, it is preferable to contain one or more selected from Zn, Ni, Co, Mn, Cr, V, Zr, Sn, Ti, and B, in consideration of corrosion resistance in a case where the aluminum alloy material is used in a corrosion environment.

<Balance: Al and Inevitable Impurities>

A balance other than the components described above is aluminum (Al) and inevitable impurities. Here, the inevitable impurities indicate impurities at a content level that can be inevitably contained on a manufacturing process. The inevitable impurities can be a factor for decreasing the conductivity in accordance with the content, and thus, it is preferable to suppress the content of the inevitable impurities to some extent, in consideration of a decrease in the conductivity. Examples of a component as the inevitable impurities include bismuth (Bi), lead (Pb), gallium (Ga), strontium (Sr), and the like. Note that, an upper limit of the content of each of the components of the inevitable impurities may be 0.05 mass %, and a total amount of the components of the inevitable impurities may be 0.15 mass %.

Such an aluminum alloy material can be attained by controlling the alloy composition or the manufacturing process in combination. Hereinafter, a preferred manufacturing method of the aluminum alloy material of the present invention will be described.

(2) Manufacturing Method of Aluminum Alloy Material According to One Example of Present Invention Such an aluminum alloy material according to one example of the present invention increases a strength, in particular, by introducing the crystal grain boundary into an Al—Mg—Si—Fe-based alloy at a high density. Therefore, an approach with respect to a high strength is greatly different from a method of precipitation-hardening an Mg—Si compound, which has been generally performed in an aluminum alloy material of the related art. Further, in the aluminum alloy material according to one example of the present invention, the crystal orientation distribution that is formed by deformation is changed by changing a frictional state between the material and a tool, but not by simply increasing the strength. As a result thereof, it is possible to make a high strength and the workability compatible. Hereinafter, a preferred manufacturing method of the aluminum alloy material of the present invention will be described in detail.

In general, in a case where a deformation stress is applied to a metal material, crystal slip occurs as an elementary step of the deformation of metal crystals. It can be considered that a metal material in which such crystal slip easily occurs has a small stress that is required for deformation and a low strength. For this reason, in order to increase the strength of the metal material, it is important to suppress the crystal slip that occurs in a metal structure. The presence of the crystal grain boundary in the metal structure is considered as a factor of inhibiting such crystal slip, and such a crystal grain boundary is capable of preventing the crystal slip from propagating in the metal structure when a deformation stress is applied to the metal material, and as a result thereof, the strength of the metal material is increased.

For this reason, in order to increase the strength of the metal material, it is considered as desirable to introduce the crystal grain boundary into the metal structure at a high density. Here, for example, the division of the metal crystals due to the deformation of the metal structure as described below is considered as a forming mechanism of the crystal grain boundary.

In general, in a polycrystalline material, a stress state is a complicated multi-axis state due to a difference between the orientations of the adjacent crystal grains, and a space distribution of distortion between in the vicinity of a surface layer in contact with a working tool and in a bulk. Due to such influences, the crystal grains that are in a single orientation before deformation are divided into a plurality of orientations in accordance with the deformation, and the crystal grain boundary is formed between the divided crystals. Mg and Si that are added have a function of stabilizing the crystal grain boundary that is formed in working.

However, in general, a metal material subjected to swaging has low elongation of approximately several % in a tensile test, and is poor in ductility. Therefore, in the case of increasing the strength by the method as described above, the workability that is properties opposite to the strength tends to decrease. In particular, an aluminum-based material, in general, has poor workability, compared to a copper-based material having the same degree of elongation properties.

Deformation that mainly occurs due to working such as twisting, knitting, weaving, and binding is bending deformation. The metal crystals are unevenly deformed by the bending deformation, and thus, local distortion occurs, concavities and convexities are formed on the surface of the metal material, and concavities and convexities become a stress concentration point, and the deformation is further localized, and thus, a crack occurs. Such uneven deformation is a plastic unstable phenomenon after the metal material reaches a work-hardening limit.

Then, the present inventors have found that the ease of occurrence of such uneven deformation relates to a crystal orientation of the metal material. In general, in a case where a stress of plane distortion deformation including monoaxial deformation such as drawing working or swaging working, rolling working, or the like is applied to a metal material of a face-centered cubic lattice (FCC) metal, a stable orientation according to such deformation is crystal orientation in which a {100} plane or a {111} plane of crystals is oriented in a longitudinal direction LD of the metal material (a drawing direction DD) (LD is parallel to the direction of <100> or the direction of <111>, hereinafter, it is notated as LD//<100> or LD//<111>). Among them, in the crystals oriented in LD//<100>, uneven deformation is unlikely to occur. In contrast, in the crystals oriented in LD//<111>, uneven deformation is likely to occur regardless of which crystal plane is oriented in a surface direction (a normal direction ND). That is, in the ease of occurrence of uneven deformation, which crystal plane is oriented in LD is important.

Figure 2:
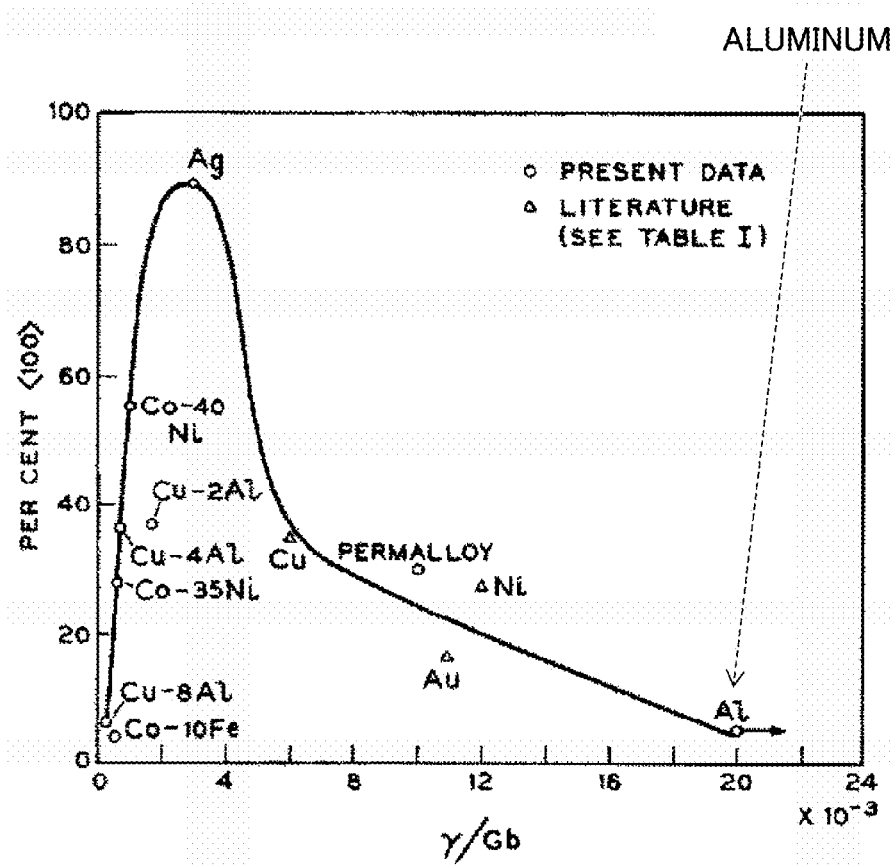
FIG. 2 illustrates study results of A. T. English, and is a graph in which a crystal orientation distribution after cold wire drawing in various metals and alloys having a face-centered cubic lattice structure is organized by stacking-fault energy.

However, it is known that the crystal orientation distribution that occurs by working deformation as described above, in particular, a ratio of the crystals being oriented in LD//<100> or LD//<111> is different in accordance with the type of metal. For example, according to the study of A. T. English in 1965 (cited from A. T. ENGLISH and G. Y. CHIN, "On the variation of wire texture with stacking fault energy in f.c.c. metals and alloys" ACTA METALLURGICA VOL. 13 (1965) p. 1013-1016), a crystal orientation distribution of aluminum in the case of being subjected to wire drawing working at an area reduction rate of 99.97% is greatly different from that of the case of copper and nickel that are also an FCC metal. As illustrated in FIG. 2, in the case of copper and nickel, ratios of crystal orientation of LD//<100> (volume ratios of the crystals) are 34% and 27%, respectively. In contrast, in the case of aluminum, a ratio of crystal orientation of LD//<100> (a volume ratio of crystals) is merely 5%, that is, a crystal orientation distribution is obtained in which crystal orientation of LD//<111> is remarkable. Accordingly, in the case of an aluminum alloy material prepared by a general working method (drawing working, rolling working, or the like), most crystal orientation due to the deformation is the crystal orientation of LD//<111> in which uneven deformation is likely to occur.

As a result of more intensive studies of the present inventors, based on such a finding, it has been found that in the crystal orientation distribution of the primary surface of the aluminum alloy material, (1) the crystal orientation of LD//<111> is a factor of decreasing bending workability of an aluminum alloy material subjected to strong deformation, and (2) in a high-strength material, bending workability can be considerably improved by decreasing the crystal orientation of LD//<111> and by increasing the ratio of the crystal orientation of LD//<100>.

In particular, in the texture of the primary surface of the aluminum alloy material, in a case where the crystals are oriented in LD//<100>, the amount of slip deformation of the crystals decreases, and cross slip remarkably occurs, from a difference in geometric arrangement of a crystal slip system, compared to a case where the crystals are oriented in LD//<111>. According to such two functions, a work-hardening rate in the bending deformation is greatly reduced. The plastic unstable phenomenon is remarkably suppressed, and thus, the occurrence of a crack can be prevented.

Figure 3:
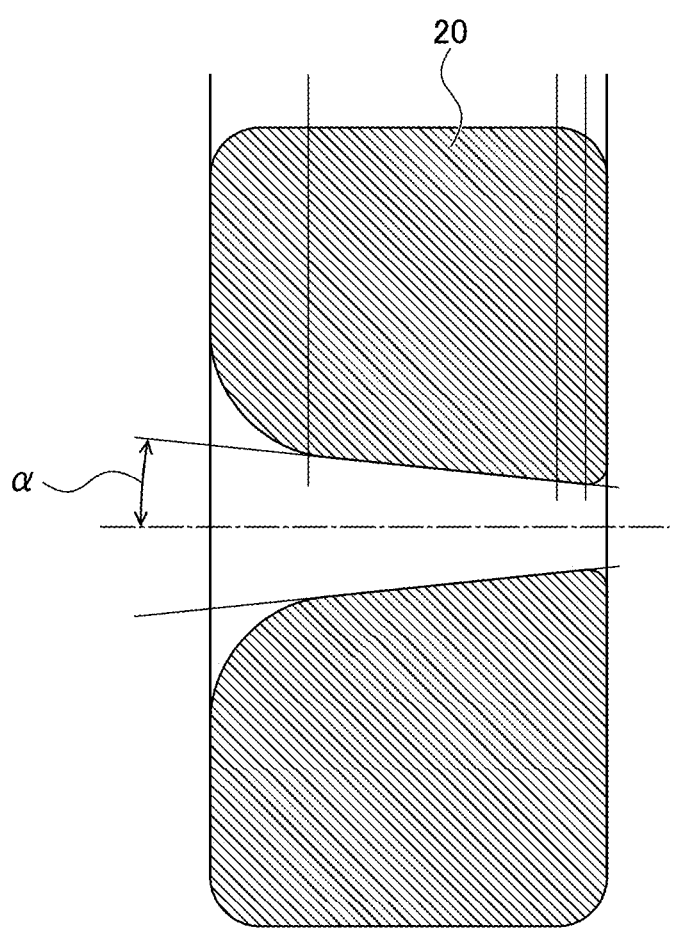
FIG. 3 is a sectional view of a die, and illustrates a die half-angle α.

Next, an example of a method for increasing the crystal orientation of LD//<100> will be described. For example, in a case where the wire rod is subjected to the wire drawing working (die drawing), a die half-angle $\alpha$ (refer to FIG. 3) is 8° to 13°, and a working rate per one pass is 5% to 11%. Such a condition is greatly different from a general condition in which a die half-angle is 4° to 6°, and a working rate per one pass is 13% to 20%. A general wire drawing working condition (the die half-angle $\alpha$ and the working rate per one pass) is determined from the viewpoint of reducing a drawing force and of preventing an internal crack, and in such a condition, LD//<111> is strongly developed, and thus, it is not possible to make the strength and the formability compatible. As with the present invention, an additional shearing force on the surface of the aluminum alloy material as a material from a tool is increased by increasing the die half-angle and by decreasing the working rate per one pass, and thus, the orientation of LD//<111> can be reduced, and the orientation of LD//<100> can be reinforced. In the condition of the present invention, it is preferable that a working temperature is 60° C. to 80° C., in order to reduce the drawing force or the internal crack.

In the present invention, with respect to the aluminum alloy material having the predetermined alloy composition described above, the working degree of the total (a total working degree) of the cold working [1] is 3.0 or more. In particular, it is possible to accelerate the division of the metal crystals due to the deformation of the metal structure and to introduce the crystal grain boundary into the aluminum alloy material at a high density, by increasing the total working degree. As a result thereof, the strength of the aluminum alloy material is considerably improved. Such a total working degree is preferably 4.5 or more, is more preferably 6.0 or more, is even more preferably 7.5 or more, and is most preferably 8.5 or more. In addition, an upper limit of the total working degree is not particularly defined, but is generally 15.

Note that, when a cross section area before working is s1, and a cross section area after working is s2 (s1>s2), a working degree η is represented by Expression (1) described below.

Working Degree (Non-Dimensional): η=ln(s1/s2)    (1)

A working method may be suitably selected in accordance with the shape of the aluminum alloy material that is a target (a wire and rod material, a board, a strip, a foil, and the like), and examples of the method include drawing working using a cassette roller die, groove roll rolling, round wire rolling, a die, or the like, swaging, and the like. In any working method, the crystal orientation distribution of the present invention can be obtained by increasing the friction between the tool and the material and by actively introducing additional shearing distortion.

The aluminum alloy material is not particularly limited insofar as the aluminum alloy material has the alloy composition described above, and for example, an extrusion material, an ingot material, a hot rolling material, a cold rolling material, and the like can be suitably selected in accordance with the purpose of use.

In addition, in the present invention, in order to release a residual stress or improve the elongation, the temper annealing [2] may be performed as the final treatment with respect to the aluminum alloy material. In the case of performing the temper annealing [2], a treatment temperature is 50° C. to 130° C. In a case where the treatment temperature of the temper annealing [2] is lower than 50° C., it is difficult to obtain the effect as described above, and in a case where the treatment temperature is higher than 130° C., the growth of the crystal grains is caused by recovery or recrystallization, and the strength decreases. In addition, a retention time of the temper annealing [2] is preferably 24 hours to 48 hours. Note that, terms and conditions of such a heat treatment can be suitably adjusted in accordance with the type or amount of inevitable impurities and the solid solution/precipitation state of the aluminum alloy material.

In addition, in the present invention, as described above, working having a high working degree is performed with respect to the aluminum alloy material by a method such as drawing or rolling using a die. For this reason, an elongated aluminum alloy material is obtained as a result. On the other hand, in a manufacturing method of an aluminum alloy material of the related art, such as powder sintering, compression twisting working, high pressure torsion (HPT), forging working, and equal channel angular pressing (ECAP), it is difficult to obtain such an elongated aluminum alloy material. Such an aluminum alloy material of the present invention is preferably manufactured at a length of 10 m or more. Note that, an upper limit of the length of the aluminum alloy material at the time of being manufactured is not particularly set, but is preferably 6000 m, in consideration of operability or the like.

In addition, it is effective to increase the working degree in order to make the crystal grains fine, and thus, in a case where the aluminum alloy material of the present invention, as described above, is prepared particularly as a wire and rod material, the configuration of the present invention is easily attained as the diameter decreases, and in a case where the aluminum alloy material of the present invention is prepared as a board or a foil, the configuration of the present invention is easily attained as the thickness decreases.

In particular, in a case where the aluminum alloy material of the present invention is the wire and rod material, a wire diameter thereof is preferably 2 mm or less, is more preferably 1 mm or less, is even more preferably 0.4 mm or less, and is particularly preferably 0.2 mm or less. Note that, a lower limit is not particularly set, but is preferably 0.01 mm, in consideration of the operability or the like. One of the advantages of an aluminum alloy wire and rod material of the present invention is that the aluminum alloy wire and rod material has a high strength even in a state of a fine wire, and thus, can be used as a thin single wire.

In addition, in a case where the aluminum alloy material of the present invention is the board, a board thickness thereof is preferably 2 mm or less, is more preferably 1 mm or less, is even more preferably 0.4 mm or less, and is particularly preferably 0.2 mm or less. Note that, a lower limit is not particularly set, but is preferably 0.01 mm. One of the advantages of an aluminum alloy board of the present invention is that the aluminum alloy board has a high strength even in the shape of a thin board or foil, and thus, can be used as a thin single layer.

In addition, as described above, the aluminum alloy material of the present invention is worked to be thin, and a plurality of aluminum alloy materials are prepared and joined to be thick, and thus, can also be used in an intended application. Note that, a known method can be used as a joining method, and examples of the method include pressure welding, welding, joining using an adhesive agent, friction stirring and joining, and the like. In addition, in a case where the aluminum alloy material is the wire and rod material, a plurality of aluminum alloy materials are bundled and twisted, and thus, can also be used in an intended application, as an aluminum alloy twisted wire. Note that, a step of the temper annealing [2] described above may be performed after the aluminum alloy material subjected to the cold working [1] described above is worked by joining or twisting.

(3) Structural Characteristics of Aluminum Alloy Material of Present Invention
<Metal Structure>

In the aluminum alloy material of the present invention that is manufactured by the manufacturing method as described above, the crystal grain boundary is introduced into the metal structure at a high density. Such an aluminum alloy material of the present invention has the fibrous metal structure in which the crystal grains extend in one direction, and in the cross section parallel to the one direction described above, the average value of the dimensions of the crystal grains described above in the direction perpendicular to the longitudinal direction is 400 nm or less. Such an aluminum alloy material has a unique metal structure that does not exist in an aluminum alloy material of the related art, and thus, is capable of having a remarkably high strength, compared to the aluminum alloy material of the related art (here, excluding a 2000-based aluminum alloy material or a 7000-based aluminum alloy material of a high strength in which the corrosion resistance, the workability, and the like are degraded).

The metal structure of the aluminum alloy material of the present invention is a fibrous structure, in which the crystal grains in an elongated shape extend in one direction into a fibrous shape. Here, the "one direction" corresponds to the working direction (the drawing direction) of the aluminum alloy material, and in a case where the aluminum alloy material is the wire and rod material, the "one direction", for example, corresponds to a wire drawing direction, and in a case where the aluminum alloy material is the board or the foil, the "one direction", for example, corresponds to the rolling direction. In addition, the aluminum alloy material of the present invention, in particular, exhibits particularly excellent strength properties with respect to a tensile stress in a direction parallel to the working direction.

In addition, the one direction described above preferably corresponds to the longitudinal direction of the aluminum alloy material. That is, in a general aluminum alloy material, the drawing direction DD corresponds to the longitudinal direction LD unless the aluminum alloy material is diced into a dimension shorter than a dimension in a direction perpendicular to the working direction.

In addition, in the cross section parallel to the one direction described above, the average value of the dimensions of the crystal grains in the direction perpendicular to the longitudinal direction is 400 nm or less, is more preferably 320 nm or less, is particularly preferably 220 nm or less, and is even more preferably 180 nm or less. In the fibrous metal structure in which crystal grains having a small diameter (the dimension of the crystal grains in the direction perpendicular to the longitudinal direction) extend in one direction, the crystal grain boundary is formed at a high density, and according to such a metal structure, the occurrence of the crystal slip due to the deformation can be effectively suppressed, and thus, the development of an aluminum alloy material capable of attaining a high strength that is not capable of being attained in the aluminum-based material of the related art succeeds. In addition, there is a function that uneven deformation due to the bending deformation is suppressed by fine crystal grains. Note that, it is preferable that the average value of the dimensions of the crystal grains in the direction perpendicular to the longitudinal direction is small from the viewpoint of attaining a high strength, and a lower limit thereof as a manufactural or physical limit, for example, is 50 nm.

In addition, the dimension of the crystal grains in the longitudinal direction is not necessarily specified, but is preferably 1200 nm or more, is more preferably 1700 nm or more, and is even more preferably 2200 nm or more. In addition, an aspect ratio of the crystal grains described above is preferably 10 or more, and is more preferably 20 or more.

<Texture>

In addition, the primary surface of the aluminum alloy material of the present invention that is manufactured by the manufacturing method as described above has a texture in which the crystal orientation distribution is controlled such that the crystal orientation of LD//<111> is suppressed, and the crystal orientation of LD//<100> increases. Such a primary surface of the aluminum alloy material of the present invention has the crystal orientation distribution in which the ratio H (=K100/K111) of K100 that is the sum of the diffraction intensities resulting from the crystals in which <100> is oriented in the longitudinal direction of the crystal grains to K111 that is the sum of the diffraction intensities resulting from the crystals in which <111> is oriented in the longitudinal direction is 0.17 or more as determined by an X-ray pole figure method. Such a primary surface of the aluminum alloy material has a unique texture that does not exist in the related art, and thus, is capable of exhibiting excellent workability (in particular, bending workability).

Figure 4:
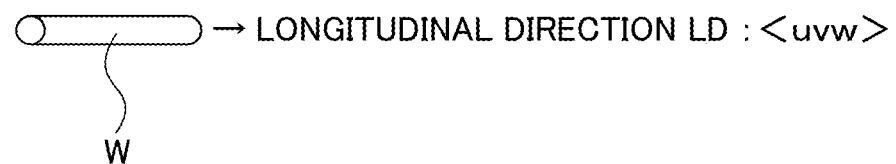
FIG. 4 is a diagram illustrating a notation method of a longitudinal direction and a sample surface direction, and directions of crystal orientation therein, by using a wire rod as an example.
Figure 5:
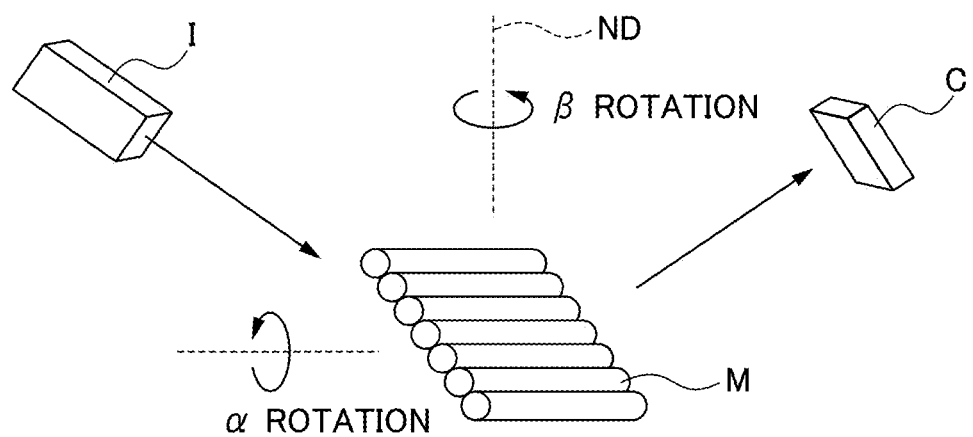
FIG. 5 is a diagram for illustrating a method of measuring a crystal orientation distribution of a surface of an aluminum alloy material with an X-ray pole figure method, by using a wire rod as an example.
Figure 6:
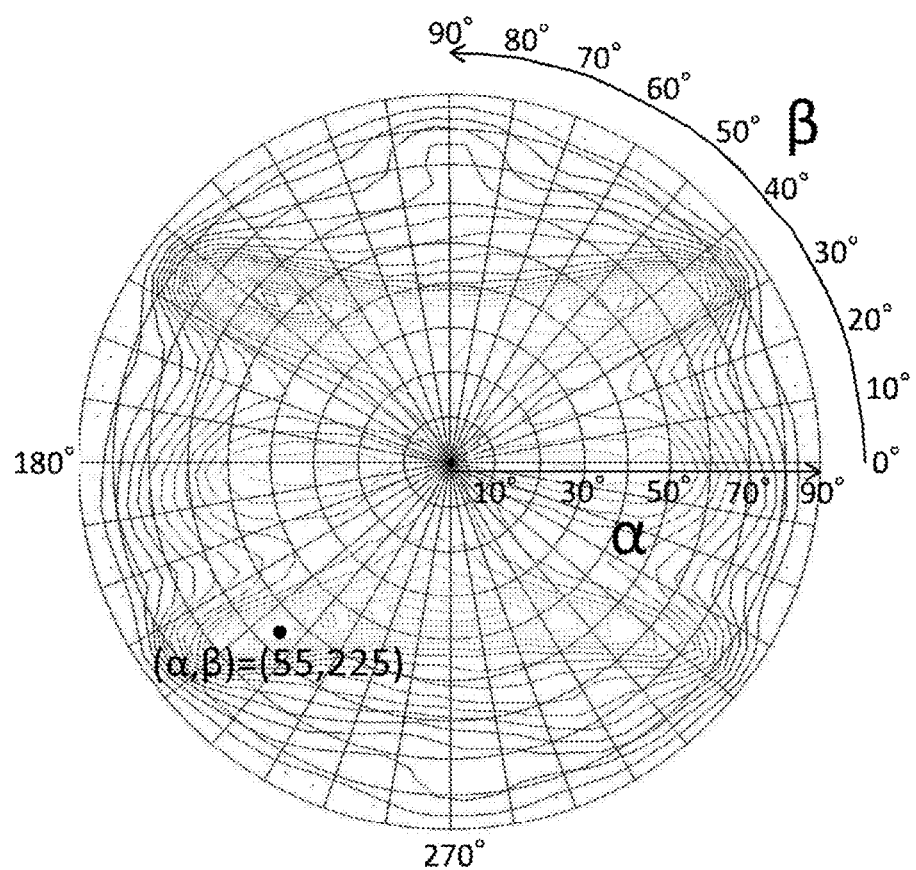
FIG. 6 is a diagram illustrating setting of axes of angles α and β in a pole figure.
Figure 7:
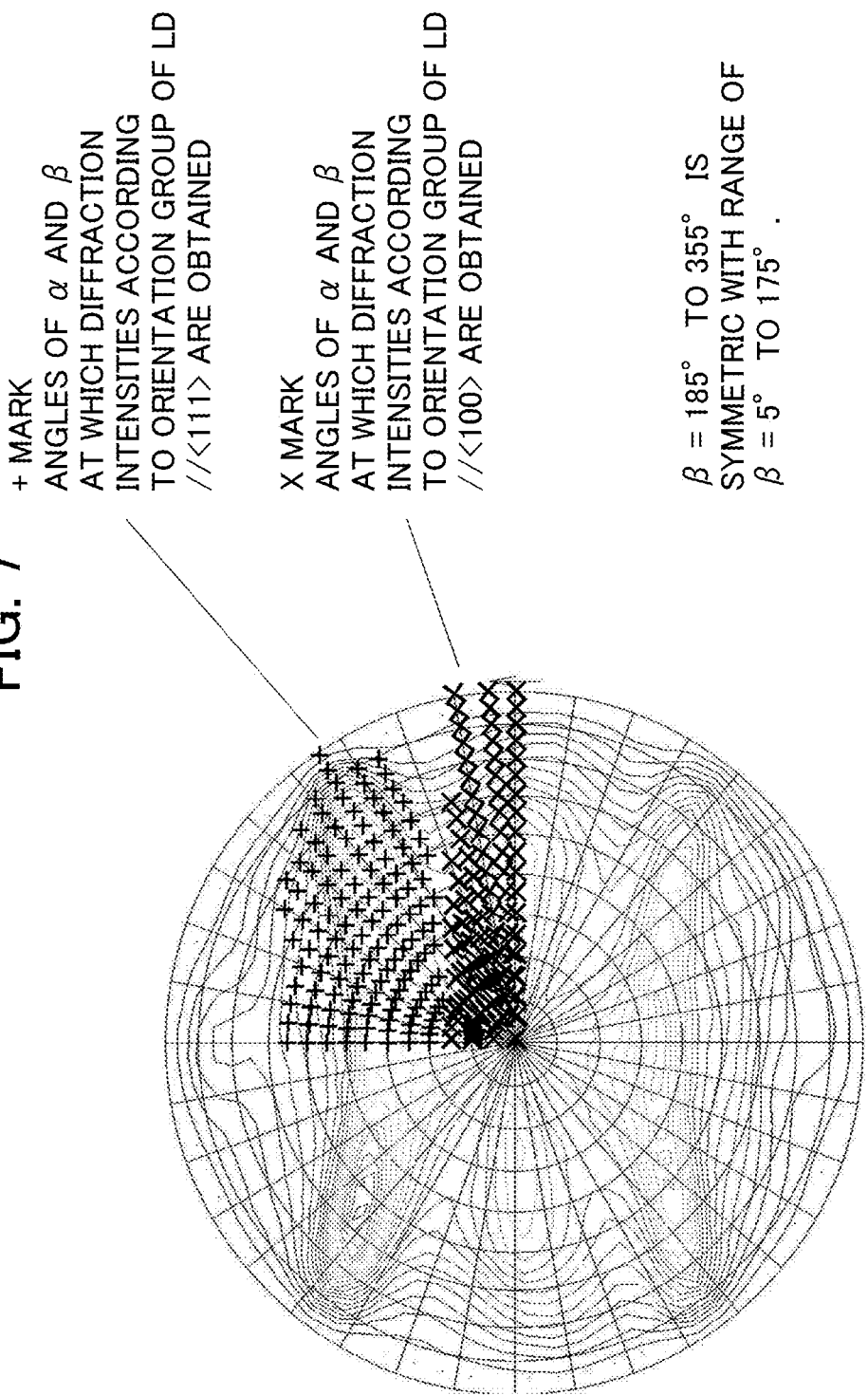
FIG. 7 is a diagram illustrating a combination of angles of α and β at which diffraction intensities according to a crystal orientation group of LD//<111> are obtained as a + mark, and similarly, a combination of angles of α and β at which diffraction intensities according to a crystal orientation group of LD//<100> are obtained as a × mark, in a pole figure, and illustrates the + mark and the × mark only in a case where β is in a range of 0° to 90° (the first octant).
Figure 8:
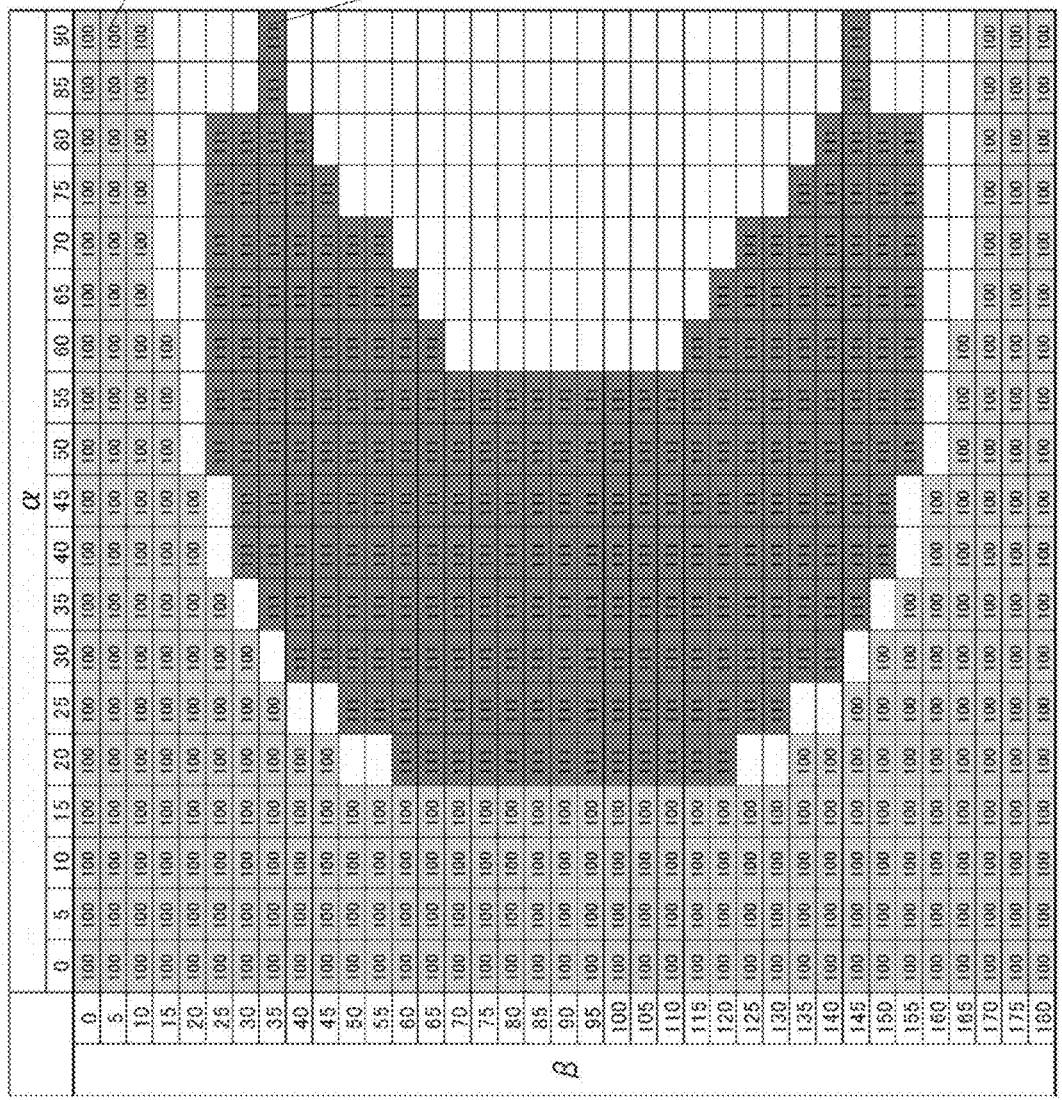
FIG. 8 illustrates an angle at which K100 and K111 are obtained, in a table in which angles of α and β are set to two axes.

As illustrated in FIG. 4, in the crystal orientation in the material, a crystal plane in the surface direction (the normal direction (ND)) is represented by {hkl}, and the orientation in the longitudinal direction (LD) is represented by <uvw>. The crystal orientation distribution is measured on the basis of a (200) X-ray pole figure. A reflection method of Schulz was adopted, and an X-ray source and a detector were fixed such that 44.72° that is a Bragg diffraction angle of a {001} plane was satisfied. A measurement system is illustrated in FIG. 5. A CuKα ray was used in the X-ray source. Then, as illustrated in FIG. 5, a diffraction X-ray strength according to α rotation and β rotation of the sample surface to be measured was measured at every 5°. The α rotation is rotation that inclines a normal line of the sample surface and is in a range of 0° to 85°, and the β rotation is rotation around the normal line of the sample surface and is in a range of 0° to 355°. The sample was prepared by arranging and pasting a plurality of wire rods that are cut into a length of 25 mm on a glass plate to cover the glass plate. A total width after the wire rods are arranged was set to be 20 mm to 30 mm. The diffraction X-ray strength that is measured is referred to as a pole figure. Rotation angles of α and β are displayed in parentheses as with (α, β), respectively. The center of a circle is (0, 0), and the direction of 3 o'clock is (90, 0). A display method of the pole figure is illustrated in FIG. 6. On the pole figure, diffraction intensities of a crystal orientation group of LD//<111> is detected by the combination of α and β that is represented by a + mark in FIG. 7. In addition, diffraction intensities of a crystal orientation group of LD//<100> is detected by the combination of α and β that is represented by a × mark in FIG. 7. A table in which the angles of α and β are set to two axes is illustrated in FIG. 8. A sum of the diffraction intensities of the crystal orientation group of LD//<111> was K111, and a sum of the diffraction intensities of the crystal orientation group of LD//<100> was K100. Then, the ratio H (=K100/K111) thereof was calculated. A peak intensity ratio H (K100/K111) increases as the crystal orientation group of LD//<100> increases and the crystal orientation group of LD//<111> decreases. Then, in the aluminum alloy material of the present invention, it is necessary that H is 0.17 or more, and H is preferably 0.40 or more. An upper limit of H is not particularly limited, but is 6 or less.

As described above, in the primary surface, the crystal orientation of LD//<111> is the factor of decreasing the bending workability of the aluminum alloy material subjected to strong deformation. Therefore, in the texture of the primary surface, it is preferable to decrease the crystal orientation of LD//<111> and to increase the ratio of the crystal orientation of LD//<100>, from the viewpoint of improving the bending workability.

(4) Properties of Aluminum Alloy Material of Present Invention

[Tensile Strength]

The tensile strength is a value that is measured on the basis of JIS Z2241:2011. The detailed measurement condition will be described in the section of Examples described below. In particular, in a case where the aluminum alloy material of the present invention is the wire and rod material, a preferred tensile strength is 370 MPa or more. Such a tensile strength is greater than 330 MPa that is a tensile strength of A6201 having the highest strength among aluminum for conduction alloys shown in ASTM INTERNATIONAL by 10% or more (Standard Name: B398/B398M-14). Accordingly, for example, in a case where the aluminum alloy wire and rod material of the present invention is applied to a cable, there is an effect of reducing the cross section area and the weight of a conductor of the cable by 10% while maintaining a high tensile force of the cable. In addition, a preferred tensile strength of the present invention is 430 MPa or more. Such a tensile strength corresponds to an average value of a range of a tensile strength of a hard copper wire shown in ASTM INTERNATIONAL (Standard Name: B1-13). Accordingly, for example, such an aluminum alloy wire and rod material of the present invention can be preferably used in an application in which the hard copper wire is used, and has an effect capable of replacing the hard copper wire. Further, more preferred tensile strength of the present invention is 480 MPa or more, and such a tensile strength is greater than 460 MPa that is the highest value of the hard copper wire described above. In addition, even more preferred tensile strength of the present invention is 540 MPa or more, and such a tensile strength, for example, is a strength comparable to the 2000-based aluminum alloy or the 7000-based aluminum alloy of a high strength, and thus, the aluminum alloy material is capable of replacing an aluminum alloy poor in the corrosion resistance or the workability. In addition, the aluminum alloy material can also be used as the replacement of various materials such as a steel-based material or a stainless steel-based material. In addition, a particularly preferred tensile strength of the present invention is 600 MPa or more. The aluminum alloy material of the present invention having such a high strength can be used as the replacement of a strong wire drawing working material of a dilute copper alloy such as a Cu—Sn-based alloy or a Cu—Cr-based alloy. Note that, an upper limit of the tensile strength of the aluminum alloy material of the present invention is not particularly limited, but for example, is 1000 MPa.

[Vickers Hardness (HV)]

The Vickers hardness (HV) is a value that is measured on the basis of JIS Z2244:2009. The detailed measurement condition will be described in the section of Examples described below. Note that, in the case of measuring a Vickers hardness (HV) of a product that has been already a part, the product is disassembled, and a cross section is subjected to mirror polishing, and thus, the cross section can also be measured. In particular, in a case where the aluminum alloy material of the present invention is the wire and rod material, the Vickers hardness (HV) is preferably 100 or more. Such a Vickers hardness (HV) is greater than 90 that is a Vickers hardness (HV) of A6201 having the highest strength in the aluminum for conduction alloys shown in ASTM INTERNATIONAL by 10% or more (Standard Name: B398/B398M-14). Accordingly, for example, in a case where the aluminum alloy wire and rod material of the present invention is applied to a cable, there is an effect of reducing the cross section area and the weight of a conductor of the cable by 10% while maintaining a high tensile force of the cable. In addition, a preferred Vickers hardness (HV) of the present invention is 115 or more. Such a Vickers hardness (HV) corresponds to intermediate HV of the hard copper wire shown in ASTM INTERNATIONAL (Standard Name: B1-13). Accordingly, for example, such an aluminum alloy wire and rod material of the present invention can be preferably used in an application in which the hard copper wire is used, and has an effect capable of replacing the hard copper wire. Further, a more preferred Vickers hardness (HV) of the present invention is 130 or more, and such a Vickers hardness (HV) is greater than 125 that is the highest value of the hard copper wire described above. In addition, an even more preferred Vickers hardness (HV) of the present invention is 145 or more, and such a Vickers hardness (HV), for example, is a strength comparable to the 2000-based aluminum alloy or the 7000-based aluminum alloy of a high strength, and thus, the aluminum alloy material is capable of replacing an aluminum alloy poor in the corrosion resistance or moldability. In addition, the aluminum alloy material can also be used as the replacement of various materials such as a steel-based material or a stainless steel-based material. In addition, a particularly preferred Vickers hardness (HV) of the present invention is 160 or more. The aluminum alloy material of the present invention having such a high strength can be used as the replacement of a strong wire drawing working material of a dilute copper alloy such as a Cu—Sn-based alloy or a Cu—Cr-based alloy. Note that, an upper limit of the Vickers hardness (HV) of the aluminum alloy material of the present invention is not particularly limited, but for example, is 250.

[Workability]

Figure 9:
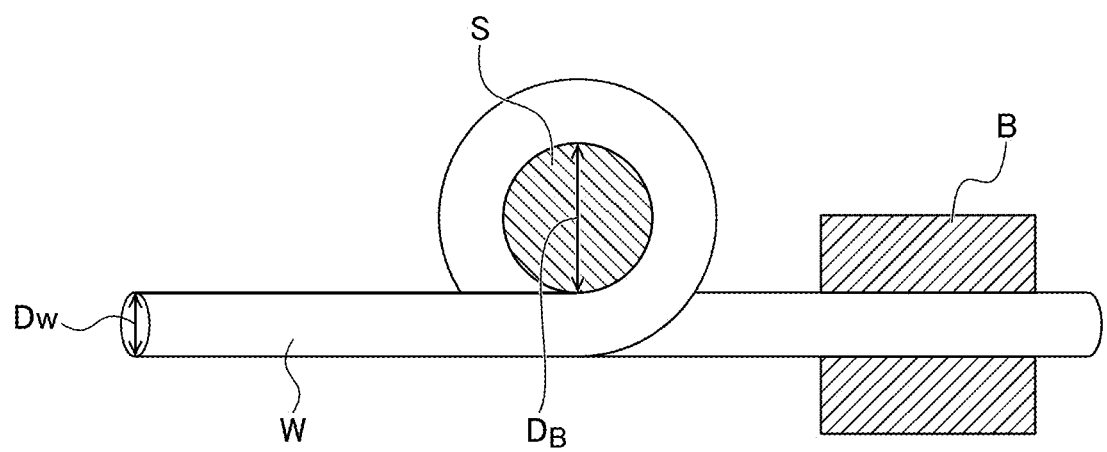
FIG. 9 illustrates an outline of a winding method that is performed in order to evaluate workability.

As an index of the workability or the formability of twisting, knitting, weaving, binding, and the like, as described at the beginning, the workability (the bending workability) was evaluated by a winding method, on the basis of JIS Z 2248(2014). FIG. 9 is a schematic view for illustrating the winding method performed in order to evaluate the workability. The workability was evaluated by fixing one side of a test piece (a wire rod) W to a fixing tool B, by performing working of winding of 360° with respect to the test piece to be close to a bending axis S while pulling the test piece, and by observing the surface of the sample W. Note that, the diameter of the bending axis S (the bending axis diameter $D_B$) was four times a wire diameter $D_W$.

In addition, the aluminum alloy material of the present invention is a bare material, that is, sufficiently has properties such as a tensile strength, Vickers hardness and workability by itself. In addition, the aluminum alloy material of the present invention is used as the bare material, and in order to impart desired properties, the surface of the aluminum alloy material may be covered with other metals, by a method such as plating or clad. In this case, the effect of desired properties can also be exhibited, in addition to the effect of the tensile strength, the Vickers hardness, and the workability, described above. Examples of the type of metal for covering include a metal, an alloy, or the like of one or more selected from the group consisting of Cu, Ni, Ag, Au, Pd, and Sn. There is an effect of reducing contact resistance, of improving corrosion resistance, or the like, as desired properties. A volume rate of the metal for covering is preferably up to approximately 25%. This is because in a case where the volume rate is excessively high, an effect of decreasing weight is reduced. It is preferably 15% or less, is more preferably 10% or less.

In the case of measuring the crystal orientation by the X-ray pole figure method, the metal for covering is dissolved with an acid such that the surface of the aluminum alloy is exposed, and then, the crystal orientation is measured as with a bare aluminum alloy. In a case where the plastic working is performed after the aluminum alloy material is covered with a metal, the metal for covering reacts with the aluminum alloy that is the base material by heat generation due to working, and thus, an intermetallic compound may be formed. Accordingly, for example, a method such as decreasing a wire drawing working speed to a 50 m/min or less or increasing the ability of cooling a workpiece by forcibly cooling an antifriction is required.

(5) Application of Aluminum Alloy Material of Present Invention

The aluminum alloy material of the present invention can be used in all applications in which an iron-based material, a copper-based material, and an aluminum-based material are used. Specifically, the aluminum alloy material can be preferably used as a conductive member such as an electric wire or a cable, a battery member such as a mesh or a net for a current collector, a fastening part such as a screw, a bolt, or a rivet, a spring part such as a coil spring, a spring member for electric contact such as a connector or a terminal, a structural part such as a shaft or a frame, a guide wire, a bonding wire for a semiconductor, a winding wire used in a power generator or a motor, and the like. In addition, the aluminum alloy material of the present invention is also excellent in the heat resistance, and thus, is more preferable in particularly an application in which the heat resistance is required. More specific application examples of the conductive member include a power wire such as an overhead transmission electric wire, OPGW, an underground electric wire, and an underwater cable, an electric wire for communication such as a telephone cable or a coaxial cable, an electric wire for a device such as a wired drone cable, a cabtire cable, an EV/HEV charging cable, a twisted cable for offshore wind power generation, an elevator cable, an umbilical cable, a robot cable, a train cable, or a trolley wire, an electric wire for transportation such as an automobile wire harness, a marine electric wire, or an airplane electric wire, a bus bar, a lead frame, a flexible flat cable, a conductor rod, an antenna, a connector, a terminal, a cable braid, a cleaner cable, a conductor for a wearable device, and the like. Examples of the battery member include an electrode of a solar battery, and the like. More specific application examples of the fastening part (member) include a set screw, a staple, a pushpin, and the like. More specific application examples of the spring part (member) include a spring electrode, a terminal, a connector, a spring for a semiconductor probe, a plate spring, a power spring, and the like. More specific application examples of the structural part (member) include a scaffold in a construction site, a conveyor mesh belt, a metal fiber for clothing, a chain mail, a fence, an insect repellent net, a zipper, a fastener, a clip, aluminum wool, a bicycle part such as a brake wire or a spoke, a reinforcement wire for reinforced glass, a pipe seal, metal packing, a protection reinforcement material for a cable, a core metal for a fan belt, a wire for driving an actuator, a chain, a hanger, a mesh for soundproofing, a shelf, a strength reinforcement wire for a high-pressure tank such as a hydrogen tank, a tension member for a cable, a mesh for screen printing, and the like. In addition, the aluminum alloy material is also preferable as a resin-based material, a plastic material, and a metal fiber that is added in order to impart electric conductive properties to cloth or the like or to control a strength or an elastic modulus. In addition, the aluminum alloy material is also preferable as a consumer member or a medical member such as an eyeglass frame, a watch belt, a pen point of a fountain pen, a fork, a helmet, or an injection needle. In any application, the aluminum alloy material according to the present invention may be used by being suitably combined or mixed with another material.

As described above, the embodiment of the present invention has been described, but the present invention is not limited to the embodiment described above, and includes all aspects included in the concept and the claims of the present invention, and can be variously modified within the scope of the present invention.

EXAMPLES

Next, in order to further clarify the effects of the present invention, examples of the present invention and comparative examples will be described, but the present invention is not limited to the examples.

Examples 1 to 29 of Present Invention

First, each rod material of 10 mmϕ, having an alloy composition shown in Table 1, was prepared. Next, each aluminum alloy wire rod (0.07 mmϕ to 2.0 mmϕ) was prepared by using each of the rod materials, in a manufacturing condition shown in Table 1.

Note that, manufacturing conditions A to H shown in Table 1 are specifically as follows.
<Manufacturing Condition A>
Preliminary heating [1] was performed such that a material temperature before being put in a die was 60° C. to 80° C., and working [2] of die drawing wire drawing was performed in a condition in which a die half-angle was 10° and a working rate per one pass was 9%. A total working degree of the working [2] was 4.5. Note that, the temper annealing [3] was not performed.
<Manufacturing Condition B>
The condition was the same as the manufacturing condition A, except that the total working degree of the working [2] was 5.5.
<Manufacturing Condition C>
The condition was the same as the manufacturing condition A, except that the total working degree of the working [2] was 7.7.
<Manufacturing Condition D>
The condition was the same as the manufacturing condition A, except that the total working degree of the working [2] was 9.9.
<Manufacturing Condition E>
The temper annealing [3] was performed in a condition of a treatment temperature of 100° C. and a retention time of 36 hours, after the manufacturing condition A.
<Manufacturing Condition F>
The temper annealing [3] was performed in a condition of a treatment temperature of 100° C. and a retention time of 36 hours, after the manufacturing condition C.
<Manufacturing Condition G>
The temper annealing [3] was performed in a condition of a treatment temperature of 100° C. and a retention time of 36 hours, after the manufacturing condition D.

Comparative Example 1

In Comparative Example 1, an aluminum wire rod (0.24 mmϕ) was prepared by using a rod material of 10 mmϕ, containing 99.99 mass %-Al, in a manufacturing condition shown in Table 1.

Comparative Examples 2 to 4

In Comparative Examples 2 to 4, each aluminum alloy wire rod (0.07 mmϕ to 2.0 mmϕ) was prepared by using each rod material of 10 mmϕ, having an alloy composition shown in Table 1, in a manufacturing condition shown in Table 1.
Note that, manufacturing conditions H to J shown in Table 1 are specifically as follows.
<Manufacturing Condition H>
The working [2] of the die drawing wire drawing was performed in a condition in which a material temperature before being put in a die was maintained at a room temperature, a die half-angle was 5°, and a working rate per one pass was 16%. The total working degree of the working [2] was 7.7. Note that, the temper annealing [3] was not performed.
<Manufacturing Condition I>
The preliminary heating [1] was performed such that a material temperature before being put in a die was 60° C. to 80° C., and the working [2] of the die drawing wire drawing was performed in a condition in which a die half-angle was 10° and a working rate per one pass was 9%. The total working degree of the working [2] was 2.8. Note that, the temper annealing [3] was not performed.

Comparative Examples 5 to 7

<Manufacturing Condition J>

The working [2] of the die drawing wire drawing was performed with respect to a rod material having an alloy composition shown in Table 1, in a condition in which a material temperature before being put in a die was maintained at a room temperature, a die half-angle was 5°, and a working rate per one pass was 16%, but disconnection occurred at a high level in the middle, and thus, the operation was stopped.

Comparative Example 8

Manufacturing Condition K in Table 1

An aging precipitation heat treatment [0] was performed with respect to a rod material having an alloy composition shown in Table 1, at a treatment temperature of 180° C. for a retention time of 10 hours, and after that, the die drawing wire drawing was performed in a condition in which a die half-angle was 5° and a working rate per one pass was 16%, but disconnection occurred at a high level in the middle, and thus, the operation was stopped.

Comparative Example 9

Manufacturing Condition L in Table 1

An electric Al metal was dissolved, and a Mg single body, an Al-25 mass % Si mother alloy, an Al-6 mass % Fe alloy, an Al-50 mass % Cu mother alloy, and an Al-10 mass % Cr mother alloy were added thereto, and were dissolved, and thus, a molten metal having an alloy composition of Al-1.03Mg-0.90Si-0.20Fe-0.16Cu-0.15Cr was manufactured, and was continuously subjected to casting rolling by a belt-and-wheel type continuous casting rolling machine, and a rough drawing wire of 9.5 mmϕ was obtained. The obtained rough drawing wire was subjected to solution water quenching at 520° C., an artificial aging treatment in which retention was performed at 200° C. for 4 hours, the wire drawing working at a working rate of 86.4% (a working degree of 2.0) in a condition in which a die half-angle was 5° and a working rate per one pass was 16%, and tempering at 140° C. for 4 hours, and thus, an aluminum alloy wire rod (3.5 mmϕ) was obtained.

Comparative Example 10

Manufacturing Condition M in Table 1

Electric aluminum having a purity of 99.8% was used, and each material of an Al-6 mass % Fe mother alloy, an Al-50 mass % Cu mother alloy, an Al-20 mass % Si mother alloy, and a Mg single body was added thereto, and thus, a molten metal having an alloy composition of Al-0.90 mass % Mg-0.80 mass % Si-0.20 mass % Fe-1.30 mass % Cu was manufactured, and a rough drawing wire (18 mmϕ) was obtained by belt-and-wheel type continuous casting rolling. The obtained rough drawing wire was subjected to first wire drawing working at a working rate of 47% (a working degree of 0.63) to be 9.5 mmϕ), and was subjected to a solution treatment at 520° C. for 2 hours, and then, was subjected to water quenching. The wire was subjected to an aging treatment at 200° C. for 4 hours, and was further subjected to second wire drawing working at a working rate of 86% (a working degree of 2.0) and a heat treatment at 140° C. for 4 hours, and thus, an aluminum alloy wire rod (3.5 mmϕ) was obtained. The wire drawing was performed in a condition in which a die half-angle was 5° and a working rate per one pass was 16%.

Comparative Example 11

Manufacturing Condition N in Table 1

A molten metal having an alloy composition of Al-0.70 mass % Mg-0.69 mass % Si-1.01 mass % Fe-0.35 mass % Cu was formed into a rod material of 10 mmϕ by a Properzi type continuous casting rolling machine. The obtained rod material peeled to be 9.5 mmϕ, was subjected to the first wire drawing working at a working degree of 2.6, and then, was subjected to a primary heat treatment at 300° C. to 450° C. for 0.5 hours to 4 hours, was further subjected to the second wire drawing working at a working degree of 3.6, and then, was subjected to a secondary heat treatment at 555° C. for 0.15 seconds in a continuous conduction heat treatment, and was further subjected to an aging heat treatment at 175° C. for 15 hours, and thus, an aluminum alloy wire rod (0.43 mmϕ) was obtained. The wire drawing was performed in a condition in which a die half-angle was 5° and a working rate per one pass was 16%.

Comparative Example 12

Manufacturing Condition O in Table 1

Aluminum having a purity of 99.95 mass %, magnesium having a purity of 99.95 mass %, silicon having a purity of 99.99 mass %, and iron having a purity of 99.95 mass % were respectively put in a graphite crucible, in a predetermined amount, and were stirred and melted at 720° C. by high-frequency induction heating, and thus, a molten metal having an alloy composition of Al-0.6 mass % Mg-0.3 mass % Si-0.05 mass % Fe was manufactured, and was moved to a container provided with a graphite die, and a wire of 10 mmϕ, having a length of 100 mm, was continuously cast at a casting speed of approximately 300 mm/minute through the graphite die subjected to water cooling. Then, cumulative equivalent distortion of 4.0 was introduced by an ECAP method. In this stage, a recrystallization temperature was 300° C. Then, in an inert gas atmosphere, pre-heating was performed at 250° C. for 2 hours. Next, a first wire drawing treatment having a working rate of 29% (a working degree of 0.34) was performed. In this stage, a recrystallization temperature was 300° C. Then, in an inert gas atmosphere, a primary heat treatment was performed at 260° C. for 2 hours. After that, the wire passed through a wire drawing die subjected to water cooling at a drawing speed of 500 mm/minute, and thus, a second wire drawing treatment having a working degree of 9.3 was performed. In this stage, a recrystallization temperature was 280° C. Then, in an inert gas atmosphere, a secondary heat treatment was performed at 220° C. for 1 hour, and thus, an aluminum alloy wire rod (0.08 mmϕ) was obtained. The wire drawing was performed in a condition in which a die half-angle was 5°, and a working rate per one pass was 16%.

Comparative Example 13

Manufacturing Condition P in Table 1

Si, Fe, Cu, Mg, Ti, and Al were dissolved at a composition in Table 1, and were cast by a continuous casting machine, and thus, a cast bar having a wire diameter of 25 mm was prepared, and the cast bar was subjected to hot rolling, and therefore, an aluminum alloy wire having a wire diameter of 9.5 mm was prepared, and was subjected to the solution treatment at 550° C. for 3 hours and was cooled. The aluminum alloy wire was subjected to straightening, washing, and electrolytic degreasing, and was polished with a stainless steel brush. An oxygen-free copper tape having a thickness of 0.4 mm and an oxygen amount of 10 ppm was vertically attached onto the aluminum alloy wire into the shape of a tube to cover the aluminum alloy wire, and a butted portion of the copper tape was continuously welded in a TIG method. Then, cold wire drawing working was performed with a die having an area reduction rate of 15% to 30% by a wire drawing machine, and thus, a copper cover aluminum alloy wire having a wire diameter of 0.2 mm was formed.

[Evaluation]

The following property evaluation was performed by using the aluminum-based wire rods according to the examples and the comparative examples described above. An evaluation condition of each of the properties is as follows. Results are shown in Table 1.

[1] Alloy Composition

An alloy composition was measured by an emission spectroscopic analysis method, on the basis of JIS H1305:2005. Note that, the measurement was performed by using an emission spectroscopic analysis device (manufactured by Hitachi High-Tech Science Corporation).

[2] Structure Observation

Figure 10:
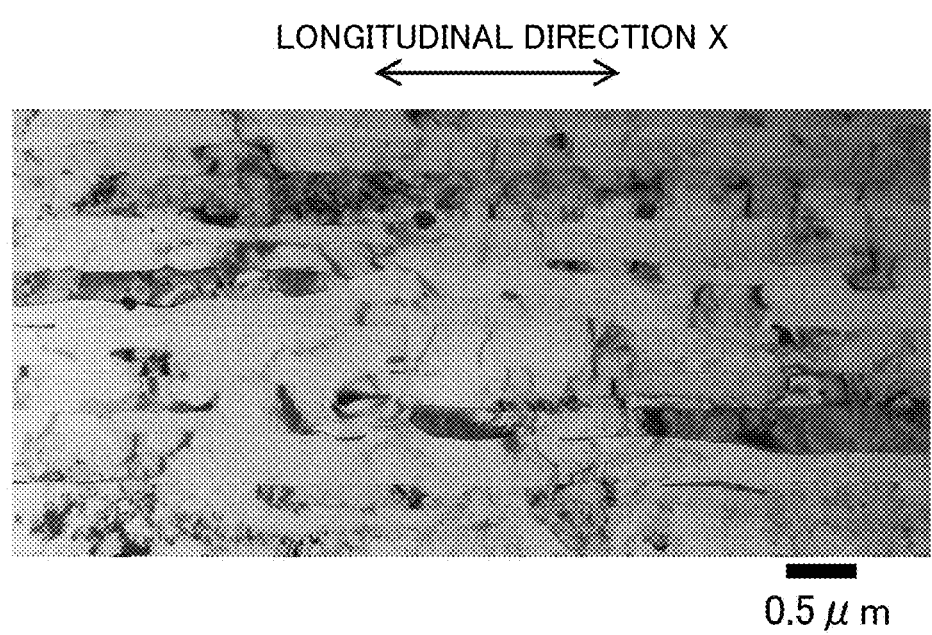
FIG. 10 is a TEM image illustrating a state of a metal structure, in a cross section parallel to a longitudinal direction LD of an aluminum alloy wire rod of Example 2 the present invention.

A metal structure was observed by using a transmission electron microscope (JEM-2100PLUS, manufactured by JEOL Ltd.), in accordance with transmission electron microscopy (TEM) observation. The observation was performed at an acceleration voltage of 200 kV. As an observation sample, a cross section parallel to a longitudinal direction of the wire rod (the wire drawing direction X) was cut into a thickness of 100 nm±20 nm by a focused ion beam (FIB), and was finished with ion milling. In the TEM observation, a difference in the contrast was recognized as the crystal orientation and a boundary in which the contrast was discontinuous different was recognized as the crystal grain boundary, by using gray contrast. Note that, even in a case where the crystal orientation is different, there may be no difference in the gray contrast in accordance with a diffraction condition of an electron beam, and thus, in such a case, an observation plane was photographed in a plurality of diffraction conditions while changing an angle between the electron beam and the sample by inclining by ±3° with two orthogonal sample rotation axes in a sample stage of an electron microscope, and the grain boundary was recognized. Note that, an observation visual field was (15 to 40) μm×(15 to 40) μm, and in the cross section described above, the observation was performed at a position in the vicinity of the middle between the center and a surface layer (a position on the center side of approximately ¼ of the wire diameter from the surface layer side), on a line corresponding to a wire diameter direction (a direction perpendicular to the longitudinal direction). The observation visual field was suitably adjusted in accordance with the size of the crystal grains. Then, in the cross section parallel to the longitudinal direction of the wire rod (the wire drawing direction X), the presence or absence of a fibrous metal structure was determined from an image that was photographed in the TEM observation. FIG. 10 is a part of a TEM image of the cross section parallel to the longitudinal direction of the wire rod of Example 2 of the present invention (the wire drawing direction X), that was photographed in the TEM observation. In this example, in a case where a metal structure as illustrated in FIG. 10 was observed, the fibrous metal structure was evaluated as "Present". Further, in each of the observation visual fields, arbitrary 100 grains were selected from the crystal grains, the dimension of each of the crystal grains in a direction perpendicular to the longitudinal direction and the dimension of each of the crystal grains in a direction parallel to the longitudinal direction were measured, and an aspect ratio of the crystal grains was calculated. Further, in the dimension of the crystal grains in the direction perpendicular to the longitudinal direction and the aspect ratio, an average value was calculated from the total number of observed crystal grains. Note that, in a case where the observed crystal grains were obviously larger than 400 nm, the number of selected crystal grains to be measured for each dimension was reduced and each average value thereof was calculated. In addition, in a case where the dimension of the crystal grains in the direction parallel to the longitudinal direction was obviously 10 times or more the dimension of the crystal grains in the direction perpendicular to the longitudinal direction, the aspect ratio was determined to be uniformly 10 or more.

[3] Measurement of Crystal Orientation Distribution (X-Ray Pole Figure)

As illustrated in FIG. 5, a glass plate was covered with the wire rod, and was set to a sample for X-ray measurement. Then, a (200) X-ray pole figure was measured in a condition of 2θ=44.72°. A sum of diffraction intensities of a crystal orientation group of LD//<111> was K111, and a sum of diffraction intensities of a crystal orientation group of LD//<100> was K100. Then, the ratio H (=K100/K111) thereof was calculated.

[4] Tensile Strength

A tensile test was performed by using a precision universal testing machine (manufactured by Shimadzu Corporation), on the basis of JIS Z2241:2001, and a tensile strength (MPa) was measured. Note that, the test described above was performed in a condition in which a distance between grades was 100 mm and a deformation speed was 10 mm/minute. In this example, in the wire rod before heating, a tensile strength of 370 MPa or more was an acceptable level.

[5] Vickers Hardness (HV)

A Vickers hardness (HV) was measured by using a fine hardness testing machine HM-125 (manufactured by Akashi Co., Ltd. (currently, Mitutoyo Corporation)), on the basis of JIS Z 2244:2009. At this time, a test force was 0.1 kgf and a retention time was 15 seconds. In addition, in the cross section parallel to the longitudinal direction of the wire rod, a measurement position was the position in the vicinity of the middle between the center and the surface layer (the position on the center side of approximately ¼ of the wire diameter from the surface layer side), on the line corresponding to the wire diameter direction (the direction perpendicular to the longitudinal direction), and an average value of measurement values (N=5) was set to the Vickers hardness (HV) of each of the wire rods. Note that, in a case where a difference between a maximum value and a minimum value of the measurement value is 10 or more, the number of measurements was further increased, and an average value of the measurement values (N=10) was set to the Vickers hardness (HV) of each of the wire rods. It is preferable that the Vickers hardness (HV) is large, and in this example, a Vickers hardness (HV) of 100 or more was an acceptable level.

[6] Workability (Bending Formability)

The workability was evaluated by the winding method, on the basis of JIS Z 2248(2014). As illustrated in FIG. 9, one side of the test piece (the wire rod) was fixed and was subjected to the working of the winding of 360° to be close to the bending axis while being pulled, and the sample surface was observed. The diameter of the bending axis (the bending axis diameter) was four times the wire diameter of the test piece (the wire rod). Evaluation results of the workability are shown in Table 2. Note that, in Table 2, in a case where a surface crack (a crack) or disconnection occurred, the workability was not determined as excellent and was represented by a "×" mark, in a case where the winding was performed without causing the surface crack, the disconnection, or the like, the workability was determined as excellent and was represented by a "○" mark, and in a case where winding working was performed by using a thin bending axis having a thickness (the bending axis diameter) three times the wire diameter of the test piece (the wire rod) such that larger bending distortion was applied, but the surface crack and the disconnection did not occur, the workability was determined as particularly excellent and was represented by a "⊙" mark.

TABLE 1

| | | Alloy composition [Mass %] | | | | | | | |
|---|---|---|---|---|---|---|---|---|---|
| | | | | | One or more selected from Cu, Ag, Zn, Ni, Co, Au, Mn, Cr, V, Zr, Sn, Ti, and B | | | | Al and |
| | | Mg | Si | Fe | Component 1 | | Component 2 | | Total content | inevitable impurities |
| Example of present invention | 1 | 0.54 | 0.54 | 0.19 | — | | — | | — | Remainder |
| | 2 | 0.54 | 0.54 | 0.19 | — | | — | | — | Remainder |
| | 3 | 0.54 | 0.54 | 0.19 | — | | — | | — | Remainder |
| | 4 | 0.54 | 0.54 | 0.19 | — | | — | | — | Remainder |
| | 5 | 0.54 | 0.54 | 0.19 | — | | — | | — | Remainder |
| | 6 | 0.54 | 0.54 | 0.19 | — | | — | | — | Remainder |
| | 7 | 0.54 | 0.54 | 0.19 | — | | — | | — | Remainder |
| | 8 | 0.24 | 1.95 | 0.19 | — | | — | | — | Remainder |
| | 9 | 0.22 | 0.22 | 0.19 | — | | — | | — | Remainder |
| | 10 | 0.81 | 0.75 | 1.42 | — | | — | | — | Remainder |
| | 11 | 0.91 | 0.88 | 0.15 | — | | — | | — | Remainder |
| | 12 | 1.76 | 0.31 | 0.11 | — | | — | | — | Remainder |
| | 13 | 1.76 | 1.85 | 0.11 | — | | — | | — | Remainder |
| | 14 | 0.73 | 0.71 | 0.28 | Cu | 0.12 | — | | 0.12 | Remainder |
| | 15 | 0.73 | 0.71 | 0.28 | Cu | 0.33 | Zr | 0.06 | 0.39 | Remainder |
| | 16 | 0.73 | 0.71 | 0.28 | Cu | 1.21 | Ag | 0.71 | 1.92 | Remainder |
| | 17 | 0.73 | 0.71 | 0.28 | Cu | 0.71 | Ni | 0.32 | 1.03 | Remainder |
| | 18 | 0.73 | 0.71 | 0.28 | Mn | 0.12 | — | | 0.12 | Remainder |
| | 19 | 0.73 | 0.71 | 0.28 | Cr | 0.22 | Sn | 0.05 | 0.27 | Remainder |
| | 20 | 0.73 | 0.71 | 0.28 | Zr | 0.13 | Cr | 0.08 | 0.21 | Remainder |
| | 21 | 0.73 | 0.71 | 0.28 | Zn | 0.11 | Au | 0.06 | 0.17 | Remainder |
| | 22 | 0.73 | 0.71 | 0.28 | Cr | 0.11 | Mn | 0.11 | 0.22 | Remainder |
| | 23 | 0.22 | 1.95 | 0.11 | Co | 0.13 | V | 0.15 | 0.28 | Remainder |
| | 24 | 0.22 | 0.22 | 0.15 | Cu | 0.53 | Cr | 0.07 | 0.60 | Remainder |
| | 25 | 0.73 | 0.71 | 1.42 | Cu | 1.22 | Mn | 0.22 | 1.44 | Remainder |
| | 26 | 0.91 | 0.88 | 0.15 | Cu | 0.07 | — | | 0.07 | Remainder |
| | 27 | 0.98 | 0.60 | 0.07 | Cu | 0.28 | Cr | 0.14 | 0.42 | Remainder |
| | 28 | 1.76 | 0.31 | 0.11 | Mn | 0.33 | Cr | 0.22 | 0.55 | Remainder |
| | 29 | 1.76 | 1.82 | 0.28 | Cu | 1.22 | Cr | 0.14 | 1.36 | Remainder |
| Comparative Example | 1 | — | — | — | — | | — | | — | Remainder |
| | 2 | <u>0.16</u> | <u>0.15</u> | 0.19 | — | | — | | — | Remainder |
| | 3 | 0.54 | 0.54 | 0.19 | — | | — | | — | Remainder |
| | 4 | 0.54 | 0.54 | 0.19 | — | | — | | — | Remainder |
| | 5 | <u>1.82</u> | <u>2.11</u> | 0.21 | Cu | 0.12 | — | | 0.12 | Remainder |
| | 6 | 0.91 | 0.88 | <u>1.62</u> | Cu | 0.12 | — | | 0.12 | Remainder |
| | 7 | 0.73 | 0.71 | 0.28 | Cu | 1.81 | Zr | 0.28 | <u>2.09</u> | Remainder |
| | 8 | 0.54 | 0.54 | 0.19 | — | | — | | — | Remainder |
| | 9 | 1.03 | 0.90 | 0.20 | Cu | 0.16 | Cr | 0.15 | 0.31 | Remainder |
| | 10 | 0.90 | 0.80 | 0.20 | Cu | 1.30 | — | | 1.30 | Remainder |
| | 11 | 0.70 | 0.69 | 1.01 | Cu | 0.35 | — | | 0.35 | Remainder |
| | 12 | 0.60 | 0.30 | 0.05 | — | | — | | — | Remainder |
| | 13 | 0.60 | 0.60 | 0.50 | Cu | 0.20 | Ti | 0.02 | 0.22 | Remainder |

(Note)
Underline in table indicates being out of proper range of present invention.

TABLE 2

| | | Manufacturing condition | Structure evaluation | | | Property evaluation | | |
|---|---|---|---|---|---|---|---|---|
| | | | Presence or absence of fibrous metal structure | Average value of dimensions t of crystal grains in direction perpendicular to longitudinal direction of crystal grains [nm] | X-ray pole figure intensity ratio H | Tensile strength [MPa] | Vickers hardness HV | Workability |
| Example of present invention | 1 | A | Present | 330 | 1.62 | 410 | 105 | ⊙ |
| | 2 | B | Present | 220 | 0.71 | 470 | 121 | ⊙ |
| | 3 | C | Present | 160 | 0.44 | 580 | 152 | ⊙ |
| | 4 | D | Present | 120 | 0.21 | 670 | 170 | ○ |
| | 5 | E | Present | 340 | 1.95 | 400 | 108 | ⊙ |
| | 6 | F | Present | 210 | 0.76 | 570 | 154 | ⊙ |
| | 7 | G | Present | 130 | 0.23 | 540 | 155 | ○ |
| | 8 | B | Present | 260 | 0.81 | 460 | 123 | ⊙ |
| | 9 | C | Present | 220 | 0.46 | 500 | 134 | ⊙ |
| | 10 | B | Present | 170 | 0.83 | 560 | 149 | ⊙ |
| | 11 | C | Present | 140 | 0.49 | 620 | 165 | ⊙ |
| | 12 | F | Present | 210 | 0.52 | 530 | 141 | ⊙ |
| | 13 | D | Present | 80 | 0.25 | 700 | 217 | ○ |
| | 14 | A | Present | 320 | 1.52 | 420 | 105 | ⊙ |
| | 15 | B | Present | 220 | 0.85 | 480 | 129 | ⊙ |
| | 16 | C | Present | 140 | 0.51 | 590 | 163 | ⊙ |
| | 17 | D | Present | 80 | 0.26 | 680 | 190 | ○ |
| | 18 | E | Present | 350 | 1.33 | 400 | 109 | ⊙ |
| | 19 | F | Present | 210 | 0.54 | 560 | 155 | ⊙ |
| | 20 | A | Present | 330 | 1.55 | 400 | 106 | ⊙ |
| | 21 | B | Present | 200 | 0.85 | 510 | 139 | ⊙ |
| | 22 | C | Present | 120 | 0.48 | 570 | 155 | ⊙ |
| | 23 | E | Present | 310 | 1.22 | 410 | 114 | ⊙ |
| | 24 | F | Present | 220 | 0.42 | 490 | 136 | ⊙ |
| | 25 | B | Present | 200 | 0.82 | 440 | 119 | ⊙ |
| | 26 | C | Present | 110 | 0.53 | 610 | 167 | ⊙ |
| | 27 | E | Present | 300 | 1.25 | 410 | 113 | ⊙ |
| | 28 | B | Present | 150 | 0.84 | 520 | 145 | ⊙ |
| | 29 | D | Present | 70 | 0.22 | 710 | 205 | ○ |
| Comparative Example | 1 | C | Absent | 800 | 0.06 | 150 | 43 | X |
| | 2 | A | Absent | 420 | 0.08 | 330 | 91 | X |
| | 3 | H | Present | 190 | 0.14 | 550 | 146 | X |
| | 4 | I | Absent | 450 | 0.15 | 340 | 92 | X |
| | 5 | J | Absent | — | — | — | — | — |
| | 6 | J | Absent | — | — | — | — | — |
| | 7 | J | Absent | — | — | — | — | — |
| | 8 | K | Absent | — | — | — | — | — |
| | 9 | L | Absent | 500 | 0.13 | 350 | 95 | X |
| | 10 | M | Absent | 500 | 0.12 | 350 | 96 | X |
| | 11 | N | Absent | 20000 | 0.25 | 240 | 73 | ○ |
| | 12 | O | Absent | 500 | 0.13 | 260 | 75 | X |
| | 13 | P | Present | 300 | 0.08 | 550 | 160 | X |

(Note)
Underline in table indicates structure evaluation being out of proper range of present invention and evaluation results not reaching acceptable level in this example.

From evaluation results of Table 2, it was checked that the aluminum alloy wire rods of Examples 1 to 29 of the present invention had the alloy composition in the proper range of the present invention, had the fibrous metal structure in which the crystal grains extended in one direction, had the average value of the dimensions of the crystal grains in the direction perpendicular to the longitudinal direction of 400 nm or less, and had the crystal orientation distribution in which the ratio H of K100 to K111 was 0.17 or more. FIG. 10 is the TEM image of the cross section parallel to the wire drawing direction of the aluminum alloy wire rod of Example 2 of the present invention. Note that, the same metal structure as that in FIG. 10 was also checked in the cross section parallel to the longitudinal direction, in the aluminum alloy wire rods according to Examples 1 and 3 to 29 of the present invention.

In all of the aluminum alloy wire rods according to Examples 1 to 29 of the present invention, having such a unique metal structure and a unique texture on the primary surface, the tensile strength was 370 MPa or more, the Vickers hardness HV was 100 or more, and the workability was also excellent or more.

Figure 11:
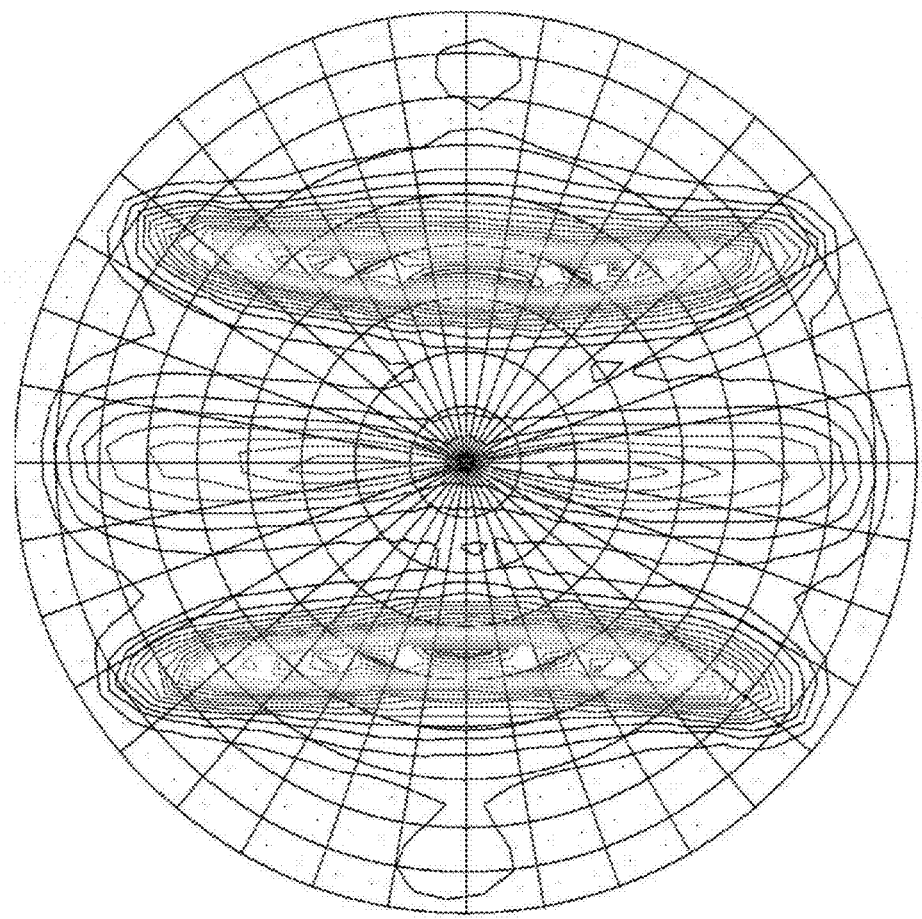
FIG. 11 is an X-ray pole figure obtained from Example 2 of the present invention.
Figure 12:
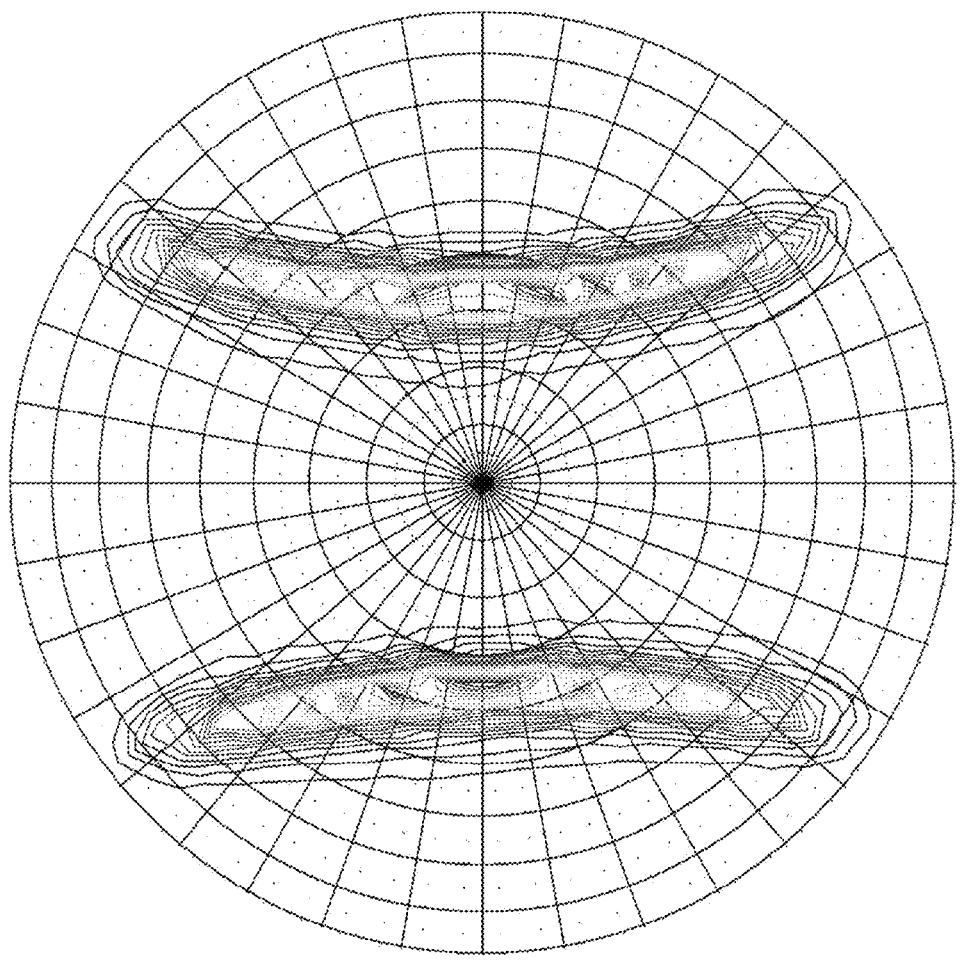
FIG. 12 is an X-ray pole figure obtained from Comparative Example 2.

In contrast, in the pure aluminum wire rod of Comparative Example 1, the composition was out of the proper range of the present invention, the average value of the dimensions t of the crystal grains in the direction perpendicular to the longitudinal direction was greater than 400 nm, and the ratio H of K100 to K111 was also less than 0.17, and thus, all of the tensile strength, the Vickers hardness, and the workability were lower than the acceptable level. In the aluminum alloy wire rod of Comparative Example 2, the content of Mg and Si was less than the proper range of the present invention, and thus, the crystals were not fine, the average value of the dimensions t was greater than 400 nm, and the ratio H of K100 to K111 was less than 0.17, and therefore, all of the tensile strength, the Vickers hardness, and the workability were lower than the acceptable level. In the aluminum alloy wire rod of Comparative Example 3, the alloy composition was in the proper range of the present invention, but the manufacturing condition (the condition of the die half-angle α) was out of the range of the present invention, and the ratio H was less than 0.17, and thus, the workability was degraded. In the aluminum alloy wire rod of Comparative Example 4, the alloy composition was in the proper range of the present invention, but the manufacturing condition (the condition of the total working degree in the working [2]) was out of the range of the present invention, the average value of the dimensions t was greater than 400 nm, and the ratio H was less than 0.17, and thus, all of the tensile strength, the Vickers hardness, and the workability were lower than the acceptable level. In the aluminum alloy wire rod of Comparative Example 5, the content of Mg and Si was greater than the proper range of the present invention, in the aluminum alloy wire rod of Comparative Example 6, the content of Fe was greater than proper range of the present invention, and in the aluminum alloy wire rod of Comparative Example 7, the total content of Cu and Zr is greater than the proper range of the present invention, and thus, the disconnection occurred at a high level in any case, and a test piece was not capable of being prepared by the wire drawing working. In the aluminum alloy wire rod of Comparative Example 8, the aging precipitation heat treatment was performed before the wire drawing working, and thus, the disconnection occurred at a high level, and a test piece was not capable of being prepared by the wire drawing working. In all of Comparative Examples 9 to 13, the alloy composition was in the proper range of the present invention, but the manufacturing condition was out of the range of the present invention, and at least one of the average value of the dimensions t and the ratio H was out of the range of the present invention, and thus, at least one of the tensile strength, the Vickers hardness, and the workability was lower than the acceptable level. FIG. 11 is a (200) X-ray pole figure obtained from Example 2 of the present invention, and FIG. 12 is a (200) X-ray pole figure obtained from Comparative Example 2. From the results of FIGS. 11 and 12, in Example 2 of the present invention, the crystal orientation group of LD//<100> was developed, and the crystal orientation group of LD//<111> was also observed. On the other hand, it is found that in Comparative Example 2, only the crystal orientation group of LD//<111> is strongly integrated.

EXPLANATION OF REFERENCE NUMERALS

1 ALUMINUM ALLOY MATERIAL
10 CRYSTAL GRAINS
20 DIE
t DIMENSION OF CRYSTAL GRAINS IN DIRECTION PERPENDICULAR TO LONGITUDINAL DIRECTION OF CRYSTAL GRAINS
X LONGITUDINAL DIRECTION OF CRYSTAL GRAINS
W ALUMINUM ALLOY (WIRE) MATERIAL
M MEASUREMENT SAMPLE
I X-RAY GENERATOR
C DETECTOR
ND NORMAL DIRECTION OF SAMPLE SURFACE
B FIXING TOOL
S BENDING AXIS
$D_B$ BENDING AXIS DIAMETER
$D_W$ WIRE DIAMETER
α DIE HALF-ANGLE

The invention claimed is:

1. An aluminum alloy material having an alloy composition comprising 0.2 mass % to 1.8 mass % of Mg, 0.2 mass % to 2.0 mass % of Si, and 0.01 mass % to 1.50 mass % of Fe, with the balance being Al and inevitable impurities,
wherein the aluminum alloy material has a fibrous metal structure in which crystal grains extend in one direction,
in a cross section parallel to the one direction, an average value of dimensions of the crystal grains in a direction perpendicular to a longitudinal direction of the crystal grains is 400 nm or less, and
a primary surface of the aluminum alloy material has a crystal orientation distribution in which when K100 is a sum of diffraction intensities resulting from crystals in which <100> is oriented in the longitudinal direction, K111 is a sum of diffraction intensities resulting from crystals in which <111> is oriented in the longitudinal direction, and H is a ratio (K100/K111) of K100 to K111, the ratio (H) is 0.17 or more as determined by an X-ray pole figure method.

2. An aluminum alloy material having an alloy composition comprising 0.2 mass % to 1.8 mass % of Mg, 0.2 mass % to 2.0 mass % of Si, and 0.01 mass % to 1.50 mass % of Fe, and a total of 2.00 mass % or less of one or more selected from the group consisting of Cu, Ag, Zn, Ni, Co, Au, Mn, Cr, V, Zr, Sn, Ti, and B, with the balance being Al and inevitable impurities,
wherein the aluminum alloy material has a fibrous metal structure in which crystal grains extend in one direction,
in a cross section parallel to the one direction, an average value of dimensions of the crystal grains in a direction perpendicular to a longitudinal direction of the crystal grains is 400 nm or less, and
a primary surface of the aluminum alloy material has a crystal orientation distribution in which when K100 is a sum of diffraction intensities resulting from crystals in which <100> is oriented in the longitudinal direction, K111 is a sum of diffraction intensities resulting from crystals in which <111> is oriented in the longitudinal direction, and H is a ratio (K100/K111) of K100 to K111, the ratio (H) is 0.17 or more as determined by an X-ray pole figure method.

3. The aluminum alloy material according to claim 1, wherein a Vickers hardness (HV) is 100 to 250.

4. The aluminum alloy material according to claim 1, wherein the surface is covered with one or more of metals or alloys selected from the group consisting of Cu, Ni, Ag, Au, Pd, and Sn.

5. A conductive member using the aluminum alloy material according to claim 1.

6. A battery member using the aluminum alloy material according to claim 1.

7. A fastening part using the aluminum alloy material according to claim 1.

8. A spring part using the aluminum alloy material according to claim 1.

9. A structural part using the aluminum alloy material according to claim 1.

10. A cabtire cable using the aluminum alloy material according to claim 1.

11. The aluminum alloy material according to claim 2, wherein a Vickers hardness (HV) is 100 to 250.

12. The aluminum alloy material according to claim 2, wherein the surface is covered with one or more of metals or alloys selected from the group consisting of Cu, Ni, Ag, Au, Pd, and Sn.

13. A conductive member using the aluminum alloy material according to claim 2.

14. A battery member using the aluminum alloy material according to claim 2.

15. A fastening part using the aluminum alloy material according to claim 2.

16. A spring part using the aluminum alloy material according to claim 2.

17. A structural part using the aluminum alloy material according to claim 2.

18. A cabtire cable using the aluminum alloy material according to claim 2.

19. The aluminum alloy material according to claim 3, wherein the surface is covered with one or more of metals or alloys selected from the group consisting of Cu, Ni, Ag, Au, Pd, and Sn.

20. A conductive member using the aluminum alloy material according to claim 3.

\* \* \* \* \*